US012621227B2

(12) United States Patent
Miguel et al.

(10) Patent No.: US 12,621,227 B2
(45) Date of Patent: May 5, 2026

(54) SERVICE ASSURANCE IN 5G NETWORKS USING KEY PERFORMANCE INDICATOR NAVIGATION TOOL

(71) Applicant: Microsoft Technology Licensing, LLC, Redmond, WA (US)

(72) Inventors: Alejandro Jose Miguel, Sammamish, WA (US); William Lee Labor, Jr., Dagsboro, DE (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 843 days.

(21) Appl. No.: 17/958,115

(22) Filed: Sep. 30, 2022

(65) Prior Publication Data

US 2024/0114363 A1 Apr. 4, 2024

(51) Int. Cl.
*G06N 3/08* (2023.01)
*H04L 43/045* (2022.01)
*H04L 43/08* (2022.01)

(52) U.S. Cl.
CPC ............. *H04L 43/045* (2013.01); *G06N 3/08* (2013.01); *H04L 43/08* (2013.01)

(58) Field of Classification Search
CPC ..... H04L 41/16; H04L 67/10; H04L 41/0895; H04L 41/145; G06N 20/00; G06N 3/08; G06N 3/09; G06N 3/092; G06N 20/10; G06N 3/0464; G06N 3/045; G06N 3/0475; G06N 5/022; G06N 3/042; G06N 3/02
See application file for complete search history.

(56) References Cited

U.S. PATENT DOCUMENTS

| | | | |
|---|---|---|---|
| 9,128,995 B1 | 9/2015 | Fletcher et al. | |
| 10,592,544 B1 * | 3/2020 | Dasgupta | G06N 3/09 |
| 2010/0049676 A1 * | 2/2010 | Devitt | H04L 41/0233 709/224 |
| 2016/0103889 A1 | 4/2016 | Fletcher | |

(Continued)

FOREIGN PATENT DOCUMENTS

| | | |
|---|---|---|
| EP | 3611957 A1 | 2/2020 |
| JP | 7759941 B2 | 10/2025 |
| WO | 2008067852 A1 | 6/2008 |

OTHER PUBLICATIONS

"3rd Generation Partnership Project; Technical Specification Group Services and System Aspects;Management and orchestration; 5G end to end Key Performance Indicators (KPI) (Release 17)", In 3GPP Standard, Technical Specification, vol. SA WG5, No. V17. 7.0, Jun. 16, 2022, 49 Pages.

(Continued)

*Primary Examiner* — Muhammad Raza

(74) *Attorney, Agent, or Firm* — Han Gim; Newport IP, LLC

(57) ABSTRACT

A navigation tool using a visual language is configured to interoperate with a curated catalog of KPIs that enables users associated with 5G mobile operators to implement service assurance in a graphical manner based on a unique ontological model of an operator's 5G network. The graphical navigation tool provides visually-based context to the catalog to streamline KPI selection while leveraging the cognitive benefits of the visual language to facilitate discovery, grouping, and connecting of the KPIs in a meaningful way to express essential aspects of 5G network performance.

12 Claims, 32 Drawing Sheets

2400

2405 — Implement a machine learning system configured for creating a semantic data model of a software-defined mobile network, the semantic data model representing network elements in the software-defined mobile network and data interfaces among the network elements, the machine learning system comprising a multi-layer neural network 2410 — Train the semantic data model by inputting representations of a training dataset of network elements and interfaces into the machine learning system and adjusting weights in one or more layers of the neural network to minimize an error function at an output of the machine learning system 2415 — Populate the semantic data model by inputting representations of an unknown dataset of network elements and data interfaces into the machine learning system to create labeled output 2420 — Utilize the populated semantic data model to create a graph of key performance indicators (KPIs) applicable to the mobile network, the graph identifying ontological relationships for KPIs among specific instances of network elements and data interfaces in the software-defined mobile network

(56) References Cited

U.S. PATENT DOCUMENTS

| | | | | |
|---|---|---|---|---|
| 2016/0253078 A1* | 9/2016 | Ebtekar | G06T 11/60 | |
| | | | 715/735 | |
| 2019/0121801 A1* | 4/2019 | Jethwa | G06F 16/243 | |
| 2021/0081819 A1* | 3/2021 | Polleri | G06F 16/252 | |
| 2021/0081837 A1* | 3/2021 | Polleri | G06F 8/30 | |
| 2021/0081848 A1* | 3/2021 | Polleri | G06F 11/3409 | |
| 2021/0194774 A1 | 6/2021 | Yang et al. | | |
| 2021/0211392 A1* | 7/2021 | Thoppil | H04L 47/762 | |
| 2021/0314365 A1* | 10/2021 | Smith | G06F 11/301 | |
| 2022/0014423 A1* | 1/2022 | Smith | H04L 69/40 | |
| 2022/0147509 A1* | 5/2022 | Muddu | G06F 16/2365 | |
| 2022/0417109 A1* | 12/2022 | Vulgarakis Feljan | G06N 20/20 | |
| 2023/0179489 A1* | 6/2023 | Latapie | G06N 5/01 | |
| | | | 706/25 | |
| 2023/0350862 A1* | 11/2023 | Munuri | G06F 16/285 | |
| 2023/0396518 A1* | 12/2023 | Strassner | H04L 41/5048 | |
| 2024/0039801 A1 | 2/2024 | Pathak | | |
| 2024/0104480 A1* | 3/2024 | Chevuru | G06N 20/00 | |
| 2024/0114349 A1 | 4/2024 | Miguel | | |
| 2024/0236698 A1* | 7/2024 | Lanfranchi | H04W 12/069 | |
| 2024/0414555 A1* | 12/2024 | Montalvo | G06N 20/00 | |
| 2025/0007942 A1* | 1/2025 | Crabtree | H04L 63/20 | |
| 2025/0267071 A1* | 8/2025 | Baktir | H04L 43/16 | |

OTHER PUBLICATIONS

"Invitation to Pay Additional Fees Issued in PCT Application No. PCT/US23/028305", Mailed Date: Nov. 2, 2023, 13 Pages.

"Invitation to Pay Additional Fees Issued in PCT Application No. PCT/US23/027987", Mailed Date: Nov. 2, 2023, 12 Pages.

International Search Report and Written Opinion received for PCT Application No. PCT/US2023/027987, Jan. 2, 2024, 21 pages.

International Search Report and Written Opinion received for PCT Application No. PCT/US2023/028305, Jan. 2, 2024, 22 pages.

International Preliminary Report on Patentability Issued in PCT Application No. PCT/US23/027987, Mailed on Apr. 10, 2025, 13 Pages.

International Preliminary Report on Patentability Issued in PCT Application No. PCT/US23/028305, Mailed on Apr. 10, 2025, 14 Pages.

Non-Final Office Action mailed on Jun. 4, 2025, in U.S. Appl. No. 17/958,079, 12 pages.

Final Office Action mailed on Nov. 24, 2025, in U.S. Appl. No. 17/958,079, 18 pages.

* cited by examiner

Figure 9:
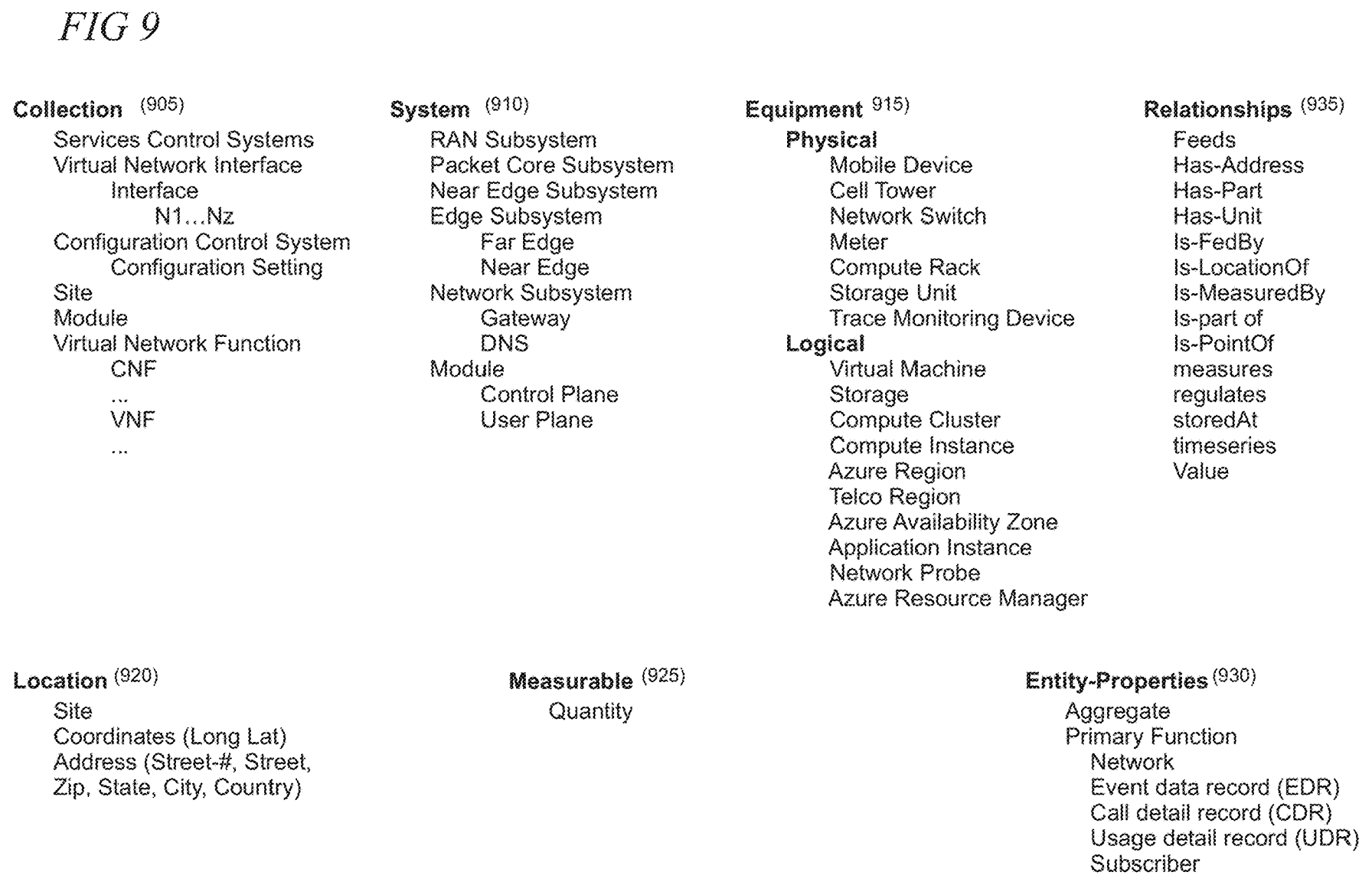

Collection (905)
Services Control Systems
Virtual Network Interface
   Interface
     N1...Nz
Configuration Control System
   Configuration Setting
Site
Module
Virtual Network Function
   CNF
   ...
   VNF
   ...

System (910)
RAN Subsystem
Packet Core Subsystem
Near Edge Subsystem
Edge Subsystem
   Far Edge
   Near Edge
Network Subsystem
   Gateway
   DNS
Module
   Control Plane
   User Plane

Equipment (915)
Physical
   Mobile Device
   Cell Tower
   Network Switch
   Meter
   Compute Rack
   Storage Unit
   Trace Monitoring Device
Logical
   Virtual Machine
   Storage
   Compute Cluster
   Compute Instance
   Azure Region
   Telco Region
   Azure Availability Zone
   Application Instance
   Network Probe
   Azure Resource Manager

Relationships (935)
Feeds
Has-Address
Has-Part
Has-Unit
Is-FedBy
Is-LocationOf
Is-MeasuredBy
Is-part of
Is-PointOf
measures
regulates
storedAt
timeseries
Value

Location (920)
Site
Coordinates (Long Lat)
Address (Street-#, Street,
Zip, State, City, Country)

Measurable (925)
Quantity

Entity-Properties (930)
Aggregate
Primary Function
Network
Event data record (EDR)
Call detail record (CDR)
Usage detail record (UDR)
Subscriber

*FIG 14*
1400

🗝 = visual language icon

| | Failure count | Success count | Attempts | SLA % | Latest event time | Earliest event time |
|---|---|---|---|---|---|---|
| ⊟ High value metric | | | | | | |
| ⊞ KPI name X | | | | | | |
| ⊞ KPI name Y | | | | | | |
| ⊟ KPI name Z | | | | | | |
| ⊞ Counter 1 | | | | | | |
| ⊞ Counter 2 | | | | | | |
| ⊞ Counter 3 | | | | | | |
| ⊞ Counter 4 | | | | | | |
| ⊞ Counter N | | | | | | |
| ⊞ Counter N+1 | | | | | | |
| ⊞ Other metrics | | | | | | |

1405

1410

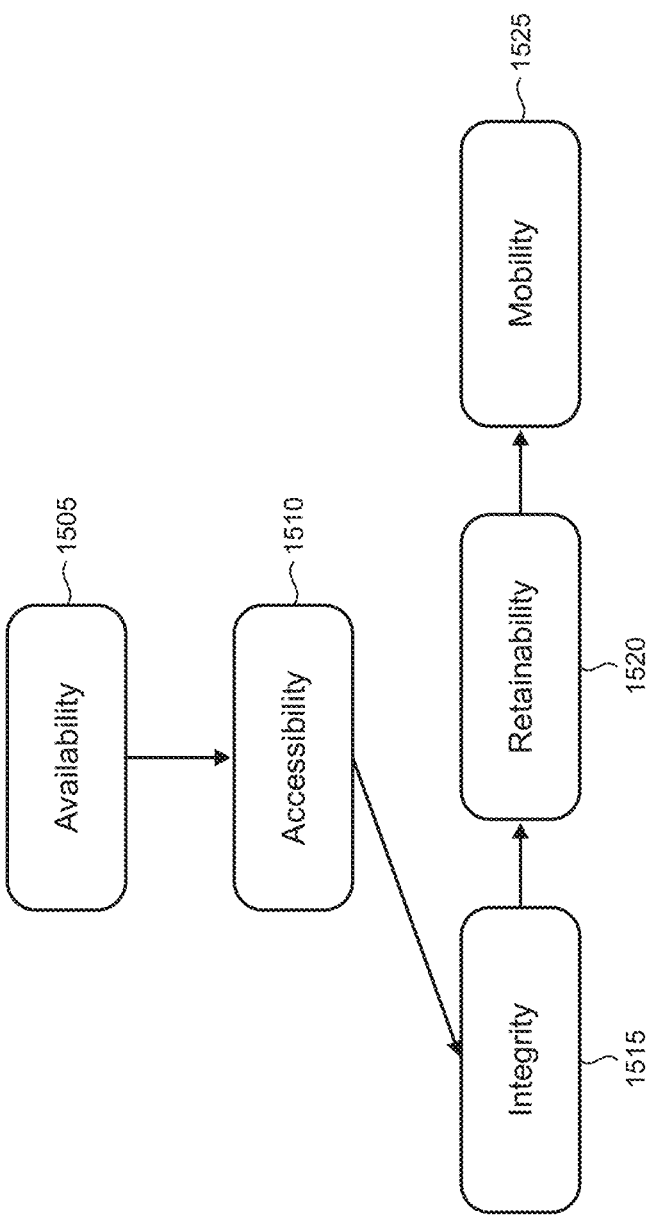
*FIG 15*
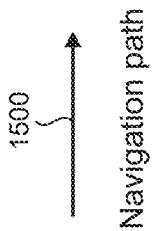

1600

*FIG 17*
1700
1705
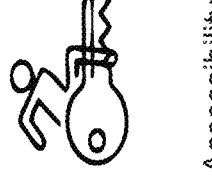
Accessibility
1710
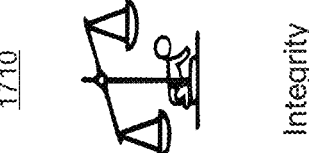
Integrity
1715
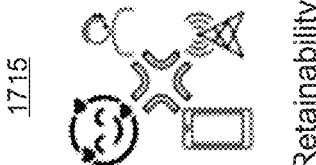
Retainability
1720
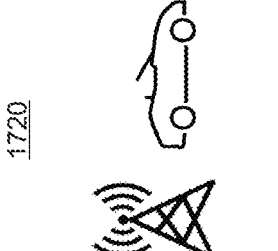
Mobility

*FIG 18*
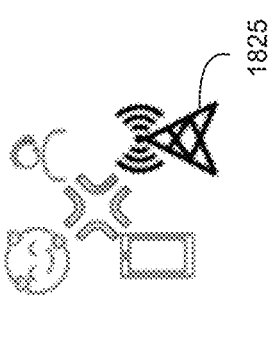
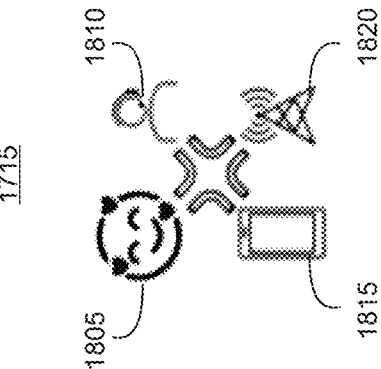

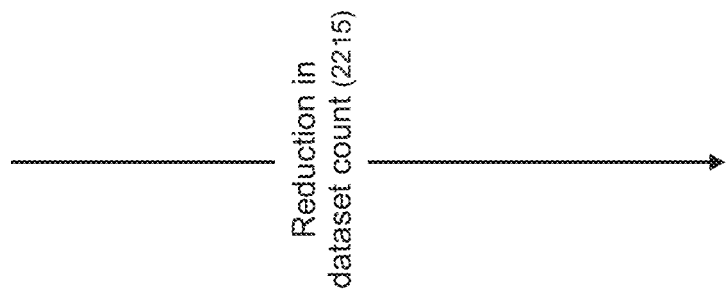
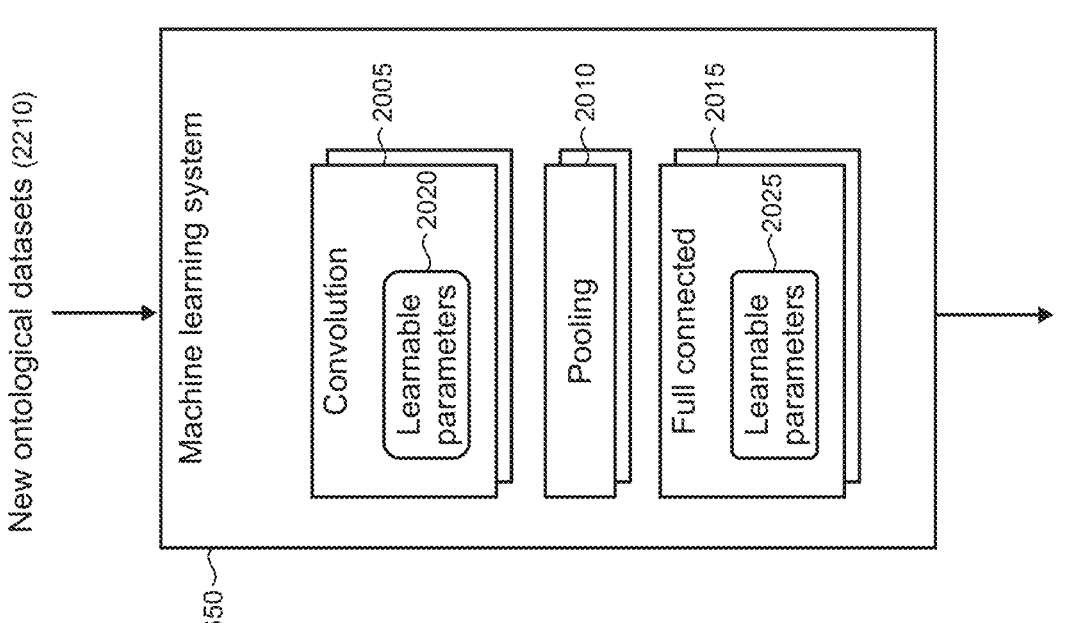
*FIG 22*

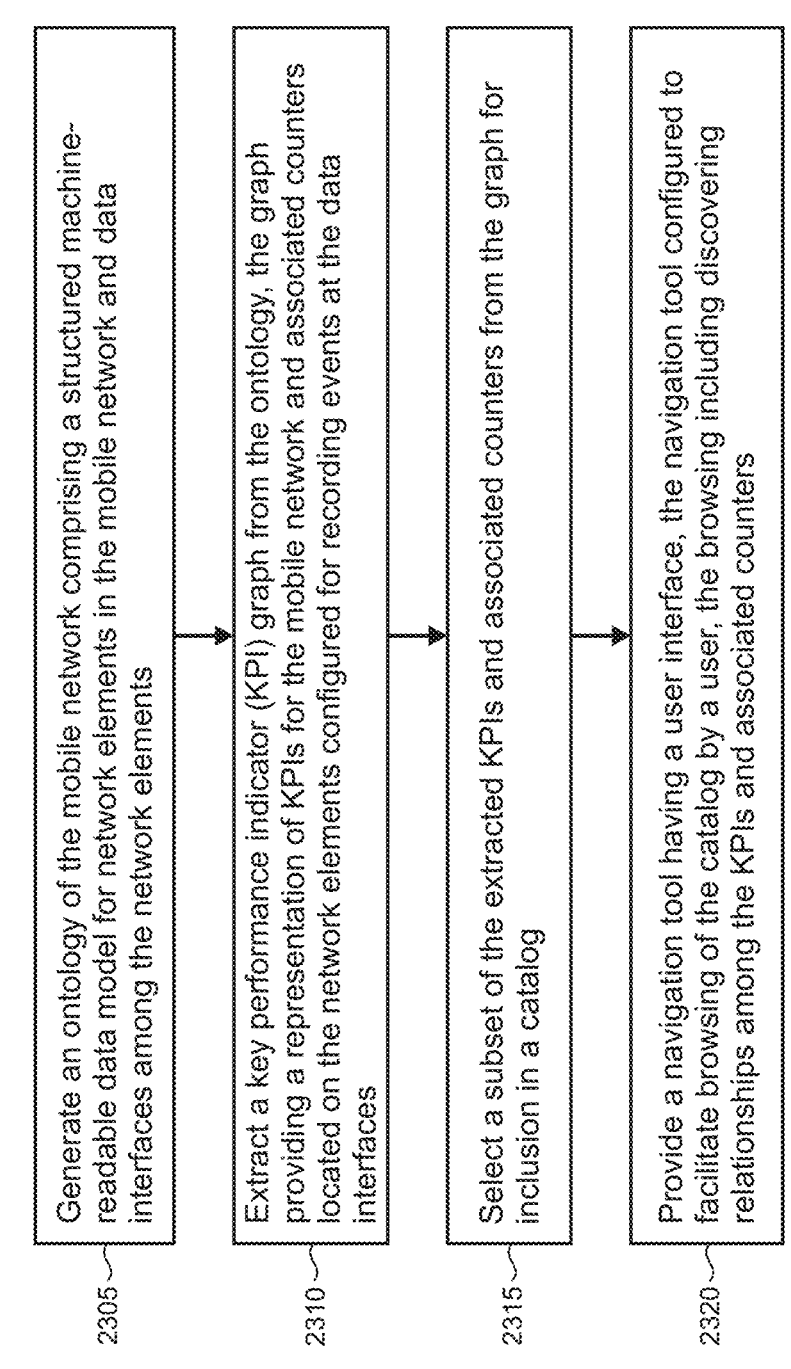

2305 — Generate an ontology of the mobile network comprising a structured machine-readable data model for network elements in the mobile network and data interfaces among the network elements 2310 — Extract a key performance indicator (KPI) graph from the ontology, the graph providing a representation of KPIs for the mobile network and associated counters located on the network elements configured for recording events at the data interfaces 2315 — Select a subset of the extracted KPIs and associated counters from the graph for inclusion in a catalog 2320 — Provide a navigation tool having a user interface, the navigation tool configured to facilitate browsing of the catalog by a user, the browsing including discovering relationships among the KPIs and associated counters

2405 — Implement a machine learning system configured for creating a semantic data model of a software-defined mobile network, the semantic data model representing network elements in the software-defined mobile network and data interfaces among the network elements, the machine learning system comprising a multi-layer neural network 2410 — Train the semantic data model by inputting representations of a training dataset of network elements and interfaces into the machine learning system and adjusting weights in one or more layers of the neural network to minimize an error function at an output of the machine learning system 2415 — Populate the semantic data model by inputting representations of an unknown dataset of network elements and data interfaces into the machine learning system to create labeled output 2420 — Utilize the populated semantic data model to create a graph of key performance indicators (KPIs) applicable to the mobile network, the graph identifying ontological relationships for KPIs among specific instances of network elements and data interfaces in the software-defined mobile network

*FIG 25*

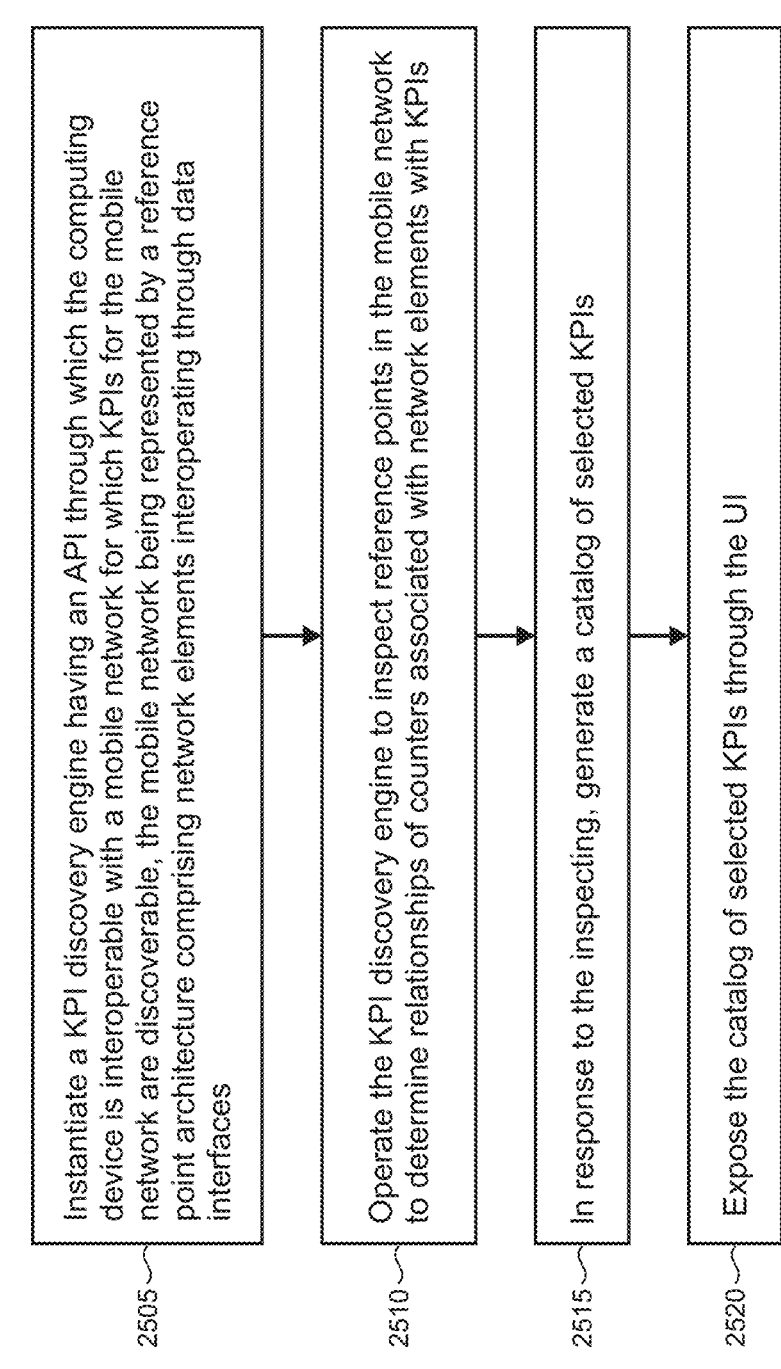

2500

2505 — Instantiate a KPI discovery engine having an API through which the computing device is interoperable with a mobile network for which KPIs for the mobile network are discoverable, the mobile network being represented by a reference point architecture comprising network elements interoperating through data interfaces 2510 — Operate the KPI discovery engine to inspect reference points in the mobile network to determine relationships of counters associated with network elements with KPIs 2515 — In response to the inspecting, generate a catalog of selected KPIs 2520 — Expose the catalog of selected KPIs through the UI

SERVICE ASSURANCE IN 5G NETWORKS USING KEY PERFORMANCE INDICATOR NAVIGATION TOOL

BACKGROUND

Fifth-generation (5G) mobile networks can be implemented using hybrid cloud technologies comprising a combination of private- and public-cloud infrastructure that supports software defined networking (SDN) in a service-based architecture (SBA). Using SDN and SBA, mobile operators can select and manage virtualized network functions (VNFs) and/or cloud-native network functions (CNFs) to deploy self-optimizing networks that can heal, defend, and provision themselves. Key performance indicators (KPIs) are quantifiable measures of performance for specific network metrics that describe the effectiveness of the 5G networks in meeting goals of end-users and mobile operators in various ways. KPIs in 5G networks are defined by the 3rd Generation Partnership Project (3GPP) in ETSI (European Telecommunications Standards Institute) TS 128 554.

Testing and verifying KPIs can be challenging for mobile operators because real-world deployments of 5G networks are typically complex and dynamic using new and legacy infrastructure that support a variety of VNFs as new services and device types are constantly introduced. A need exists for effective tools and methodologies for 5G network services to have assured performance to thereby enable mobile operator resources and efforts to be concentrated on providing maximum benefits for end-users while meeting network operating targets.

SUMMARY

A navigation tool for key performance indicators (KPIs) is configured to support a visual language to interoperate with a curated catalog of KPIs that enables users associated with 5G mobile operators to implement service assurance in a graphical manner. The curated KPI catalog is based on a graph of an operator's 5G network that is created using a unique ontology that provides a standardized semantic model applicable across diverse 5G networks which can be complex with widely varying deployment characteristics. The navigation tool enables context for the catalog entries to be surfaced to users to streamline KPI selection while leveraging the cognitive benefits of the visual language to facilitate discovery, grouping, and connecting of the KPIs for users to better understand key aspects of 5G network performance.

In various illustrative examples, the navigation tool is supported by a KPI discovery engine configured to identify relevant parameters for cataloged KPIs including data sources and network interfaces that constitute the data points from which the ontology is populated. The discovery engine includes a machine learning system adapted to build an ontologically-based KPI graph for a specific deployment of a 5G network of a mobile operator in an automated manner. An ontology is defined using multiple nodes representing network elements that include physical and logical systems and subsystems in the deployed 5G network and point-to-point interfaces between the elements known as reference points according to 3GPP TS 23.501 (ETSI TS 123 501). Employing suitable training data and algorithms, the machine learning system can identify data used to form KPIs along with relationships and connections in the KPI graph among nodes, including indirect connections among distant nodes. KPI graphs can be dynamically modified, and new graphs can be created on the fly using the machine learning system to reflect changes in 5G network configuration and new network deployments.

The navigation tool may be extended to interoperate with conventional data visualization tools to expose KPI data using standard (i.e., out-of-the-box) or custom visuals. The integrity and reliability of visual KPI data is improved because the underlying connections, sources, and calculations for the data are comprehensively known from the ontology-based knowledge graph for the deployed 5G network. This knowledge can provide context to the KPI data which can aid in interpretation and analysis of 5G network performance for service assurance and other purposes. The increased context facilitated by the navigation tool enables users to fill in gaps in understanding and leverages user knowledge to provide a holistic view of the entirety of the 5G network with enhanced connectedness across the generated KPI visuals and reports.

Use of the navigation tool provides numerous technical advantages in addition to improvement in KPI data integrity and reliability. Navigation of KPIs is streamlined, for example, as the tool enables users to select a KPI from the catalog and then quickly visually locate other KPIs and associated data of interest that are relevant to a given 5G network deployment. Using the navigation tool, the user can efficiently work through the physical and logical network systems and subsystems by following visual cues to discover relevant relationships and connections. Links may be readily established between sources and visualizations to provide context for the KPIs to thereby gain additional insights and understanding of network state and performance. The complexity of the 5G network is abstracted from the user by the visual language exposed by the navigation tool which improves the quality of the human-machine interface to reduce errors and increase network monitoring capabilities for service assurance.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. It will be appreciated that the above-described subject matter may be implemented as a computer-controlled apparatus, a computer process, a computing system, or as an article of manufacture such as one or more computer-readable storage media. These and various other features will be apparent from a reading of the following Detailed Description and a review of the associated drawings.

DESCRIPTION OF THE DRAWINGS

FIG. 9 shows illustrative specific examples of classes and relationships that may be used in a mobile network ontology arranged in accordance with the present principles;

FIG. 14 shows an illustrative user interface (UI) exposed by a navigation tool;

FIG. 15 shows an exemplary navigation path among illustrative KPI categories;

FIG. 17 shows illustrative visual language icons;

FIG. 18 shows an illustrative visual language icon having actionable elements;

FIG. 22 shows an illustrative machine learning system that is arranged to provide curated ontological datasets;

FIGS. 23, 24, and 25 show illustrative methods that may be performed when implementing the present principles;

FIG. 27 shows an illustrative 5G core network (CN) that may be implemented using a hybrid cloud environment;

FIG. 32 is a simplified block diagram of an illustrative computer system that may be used at least in part to implement the present service assurance in 5G networks using a KPI navigation tool.

Like reference numerals indicate like elements in the drawings. Elements are not drawn to scale unless otherwise indicated.

DETAILED DESCRIPTION

Figure 1:
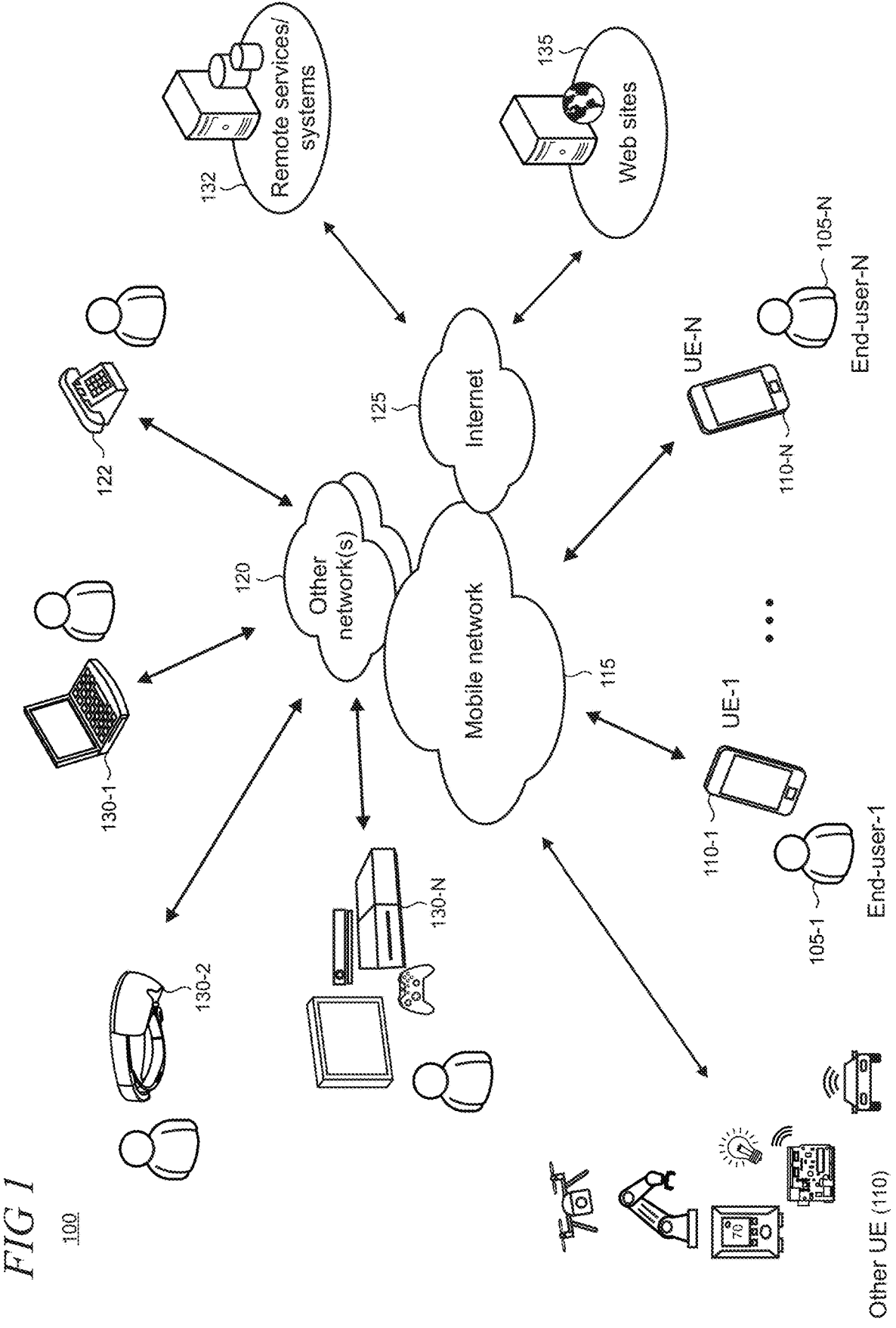
FIG. 1 shows an illustrative mobile telecommunications environment in which computing devices and associated users communicate over a mobile network with other devices and services.

FIG. 1 shows an illustrative telecommunications environment 100 in which the same or different end-users 105 may employ various computing devices, generally referred to as "user equipment" (UE) 110, that can communicate with other computing devices and various services over a mobile network 115. In some cases, other networks (representatively indicated by reference numeral 120) can also be supported in the telecommunications environment. The networks 115 and 120 can include different network types and network infrastructure in various combinations or sub-combinations including cellular networks, satellite networks, IP (Internet-Protocol) networks such as Wi-Fi under IEEE 802.11 and Ethernet networks under IEEE 802.3, a public switched telephone network (PSTN), and/or short-range networks such as Bluetooth® networks.

As used in the description of the present principles herein, an operator of a mobile network may comprise one of various parties, entities, or organizations that provide or support services to end-users of mobile computing devices using infrastructure that includes radio access networks. Operators may include for example, but not be limited to, mobile network service providers, mobile network operators (MNOs), operators of enterprises, telecommunications service providers, carrier service providers, Internet service providers (ISPs), telephone service providers, data service providers, and the like. As used herein, operators may also include parties, entities, or organizations that own or control access to a radio spectrum license from a regulatory or government entity. Operators of mobile networks may also be virtual MNOs by purchasing or otherwise obtaining rights to utilize licensed spectrum from other parties, entities, or organizations.

Some of the end-users 105 and UE 110 may have an association such as a subscription, contract, plan, or the like with one of the networks 115 and 120 (or otherwise be authorized to access and use the network), while other end-users and computing devices can have an association with another one of the networks. The depiction of two networks in this example is illustrative, as the number of networks utilized in the telecommunications environment 100 can vary by implementation.

The UE 110 shown in FIG. 1 may be representative of the wide variety of device types that may utilize mobile networking including, for example and not by way of limitation, smartphones and computing devices, drones, robots, process automation equipment, sensors, control devices, vehicles, transportation equipment, tactile interaction equipment, virtual and augmented reality (VR and AR) devices, industrial machines, and the like. Other types of telephony equipment may also be present in the telecommunications environment 100 such as conventional desktop phones 122 which are operatively coupled to a public switched telephone network ("PSTN"). Other examples may include equipment that connects to the PSTN using private branch exchanges ("PBXs") and equipment coupled to call services that are accessed using telephone numbers. Other types of computing devices 130, such as personal computers (PCs), laptop computers, multimedia consoles, and the like may be configured and equipped to support telephony applications in some cases.

The mobile network 115 may include interfaces supporting connections to public networks such as the Internet 125 so that UE 110 can access content and render end-user experiences provided by various remote or cloud-based application services 132 and websites 135. The application services and websites can support a diversity of features, services, and end-user experiences such as social networking, mapping, news and information, entertainment, travel, productivity, finance, electronic commerce (e-commerce), etc. The application services and websites are collectively referred to as application services in the description that follows.

Figure 2:
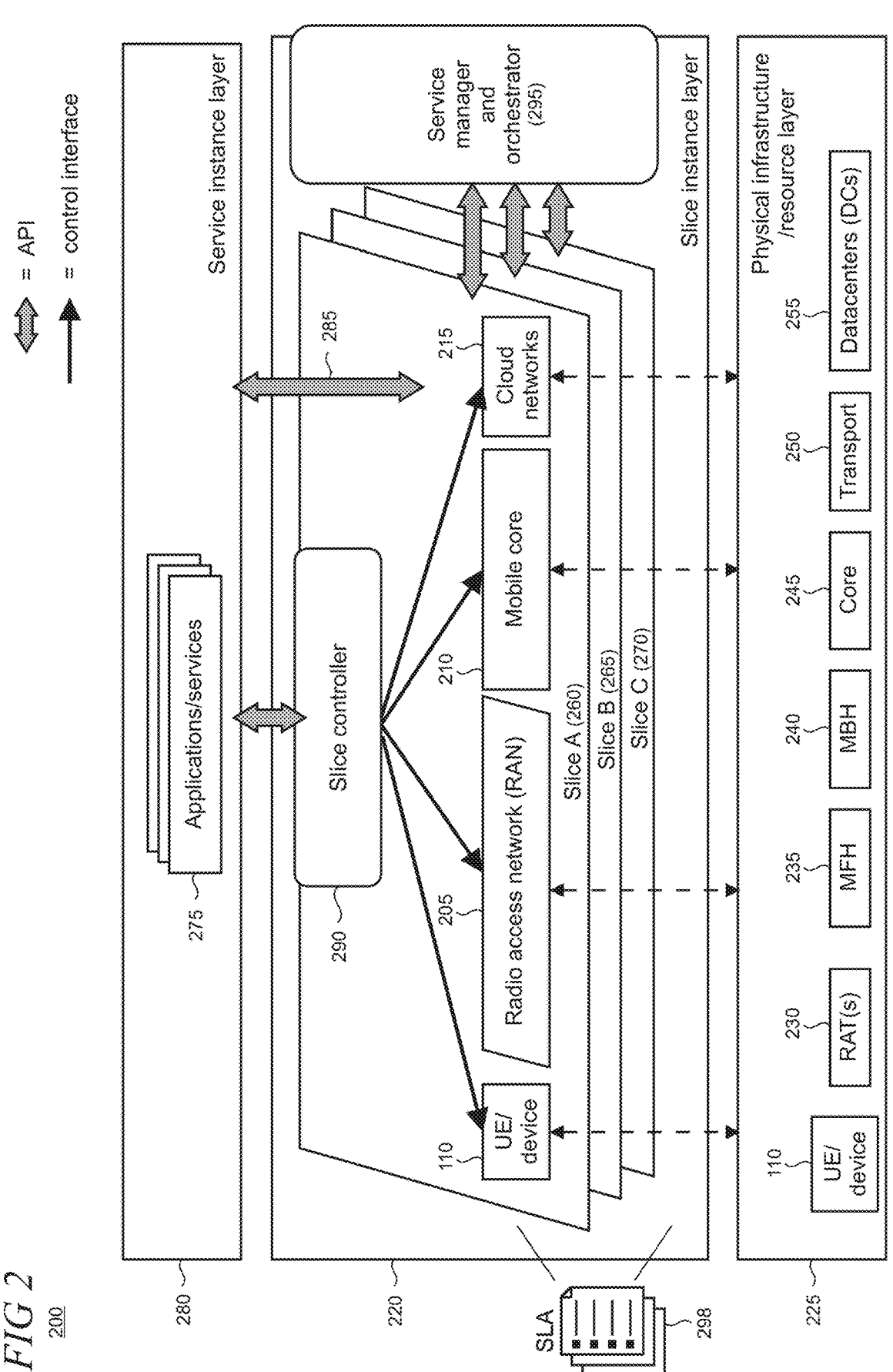
FIG. 2 shows an illustrative layered 5G network framework.

FIG. 2 shows an illustrative layered 5G network slicing framework 200 that is described in International Telecommunication Union Radiocommunication Sector ITU-R M.2083-0. Network slicing allows a 5G network operator to provide dedicated logical networks (i.e., network slices) with customer specific functionality. The 5G architecture enables different network configurations in different network slices.

The framework 200 comprises a RAN 205, mobile packet core 210, and cloud networking components 215 that are logically represented in a network slice instance layer 220 that sits above a physical infrastructure layer 225 in the framework. The physical infrastructure layer provides an abstraction of radio, compute, network, and storage resources which may include, for example, one or more RATs 230, mobile fronthaul (MFH) 235, mobile backhaul (MBH) 240, mobile core network 245, transport 250, and one or more datacenters (DCs) 255. In some cases, one or more UE instances may be implemented as resources.

In this illustrative example, the slice instance layer includes three 5G network slices—slice A 260, slice B 265, and slice C 270—but more or fewer slices may be utilized in any given implementation at any given time. These slices may include, for example, one or more standardized slice types defined under 3GPP TS 23.501 including enhance Mobile Broadband (eMBB), Ultra-Reliable and Low Latency Communications (URLLC), massive Internet-of-Things (MIoT), Vehicle-to-Everything (V2X), and High-Performance Machine Type Communications (HMTC).

Slices may be isolated by logically or physically isolating their underlying resources. The slices can support instances of various applications and/or services (collectively indicated by reference numeral 275) in a service instance layer 280, for example, using an application programming interface (API), as representatively indicated by reference numeral 285. Each network slice may be viewed as an independent logical collection of resources which can dynamically vary in configuration from slice to slice as needed to meet pre-defined technical characteristics (e.g., throughput, latency, reliability, etc.) and/or business characteristics as required by an application/service instance.

A slice controller 290 is utilized with the slicing framework 200 to maintain awareness of the application requirements to responsively allocate and manage the virtualized network functions and resources in each slice. A service manager and orchestrator 295 combines the necessary resources and functions to produce a network slice instance. Its main tasks include creation of slice instances upon the underlying physical infrastructure, dynamically mapping network functions to slice instances to meet changing context, and maintaining communication between the application and services and the framework to manage slice lifecycle.

As shown, a service level agreement (SLA) 298 is typically applicable to each of the slices 260, 265, and 270. The applicable SLAs can vary in scope and composition. The slice controller 290 may be advantageously utilized to perform resource allocation among RAN slices to meet the connectivity requirements while ensuring compliance with applicable SLA guarantees in some cases.

An SLA may be defined as a contract, between the provider of a service and its internal or external end-user or customer, that defines what services the provider will offer and the level of performance it must meet as well as any remedies or penalties should the agreed-upon levels not be realized. According to the ITU, an "SLA is a formal agreement between two or more entities that is reached after a negotiating activity with the scope to assess service characteristics, responsibilities and priorities of every part." SLAs typically establish customer expectations for a provider's performance and quality. Various types of customers can be supported in a given 5G network, typically depending on applicable circumstances and context. For example, customers may include, but are not limited to, consumers, businesses, enterprises, organizations, service providers, application developers, and the like. A 5G network operator may support its own services to customers as well as services from multiple different third-party providers. For example, one third-party provider may offer services to customers on one particular network slice while another third-party provider offers services on another network slice. Each discrete service offering may have its own corresponding distinct SLA.

SLA terms may include metrics covering technical aspects of service, for example describing a level and volume of communication services and which measure the performance characteristics of a provided service. Such technical metrics may include but not be limited to, for example, availability, throughput, latency, bit/packet error rate, and energy. SLAs may also include business, economic, and legal terms covering the agreement between the service provider and the customer. SLAs for different service and slice types can vary. For example, some slice types have more elasticity with regard to RAN resource allocation where resources can be readily adjusted depending on resource demand. Other slice types may be more inelastic. For example, the URLLC slice type may require strict resource allocation to guarantee reliability and low latency under a corresponding SLA, while enhanced MBB resources may be readily scaled downward once the edge cloud buffering is complete.

Figure 3:
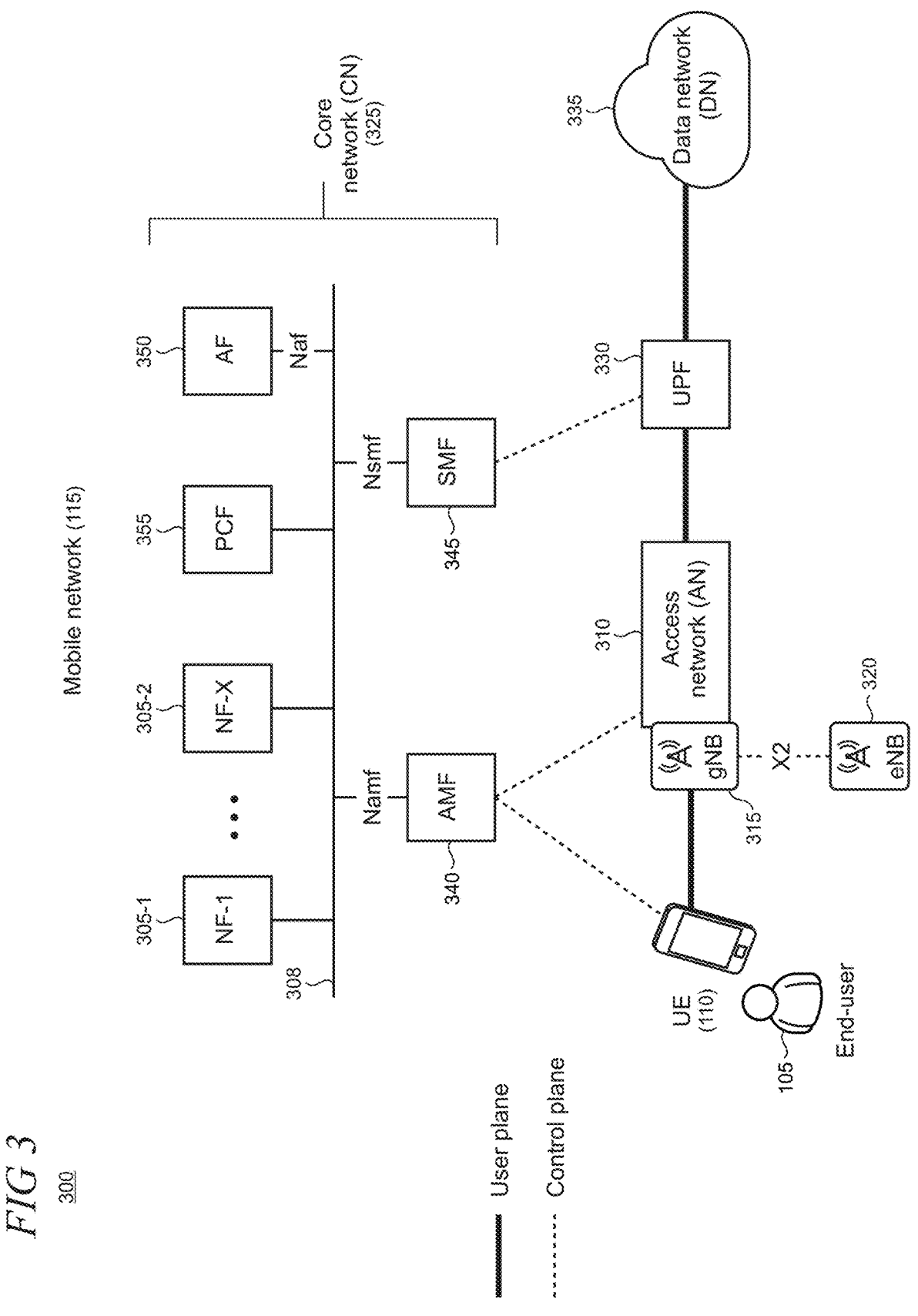
FIG. 3 shows an illustrative mobile network represented using a service-based architecture.

FIG. 3 shows the illustrative mobile network 115 as represented using a service-based architecture (SBA) 300 as defined by the 3GPP (3rd Generation Partnership Project) TS 23.501. SBAs provide a modular framework from which common applications can be deployed using components of varying sources and vendors. In SBAs, control plane functionality and common data repositories of a 5G network are delivered by way of a set of Network Functions (NFs) 305 that are interconnected with a service-based interface (SBI) bus 308, in which each has authorization to access each other's services. Assuming the role of either service consumer or service producer, NFs are self-contained, independent, and reusable. Each NF service exposes its functionality through an SBI, which employs a well-defined REST (Representational State Transfer) interface using HTTP/2 (Hypertext Transfer Protocol Version 2). With the SBA architecture 300 under 3GPP, the naming convention for data interfaces is the network function name with the letter "N". For example, "Namf" is the interface between the AMF 340 and the interface bus.

In this illustrative example, the mobile network 115 comprises 5th-generation (5G) mobile network infrastructure in a standalone (SA) architecture. However, it may be appreciated that the present principles may be adapted in some cases to non-standalone (NSA) architectures in which the 5G access network (AN) 310 (e.g., a radio access network (RAN)) is used in conjunction with existing 4th-generation (4G) LTE (Long Term Evolution) and EPC (Evolved Packet Core) infrastructure. In this scenario, in addition to a 5G gNB 315 operating a radio base station, a 4G eNB 320 is connected to the 5G AN via an X2 interface to provide NSA capabilities. In SA mode, in which 5G is fully deployed, NFs may be utilized in both the 5G core network (CN) 325 and the AN, while in NSA mode, only 4G services are supported in the 4G EPC, so NF deployment is limited to the 5G AN in such cases.

As shown in FIG. 3, a User Plane Function (UPF) 330 handles user data, performing operations such as maintaining PDU (Protocol Data Unit) sessions, packet routing and forwarding, packet inspection, policy enforcement for the user plane, QoS (Quality of Service) handling, traffic usage reporting for billing, and the like. The UPF further provides an interconnection point between the mobile network infrastructure and an external data network (DN) 335.

An Access and Mobility Management Function (AMF) 340 receives all connection and session-related information from the UE 110 but is responsible only for handling connection and mobility management tasks such as registration and authentication, identification, and mobility. All messages related to session management are forwarded over an interface to the Session Management Function (SMF) 345 that establishes and manages sessions. It also selects and controls the UPF 330 and handles paging. The Application Function (AF) 350 provides service- or application-related information to the NF service consumer. For example, the AF may perform operations such as retrieving resources and exposing services to end-users 105. The Policy Control Function (PCF) 355 supports a unified policy framework that governs network behavior by providing policy rules to control plane function(s) for enforcement.

Figure 4:
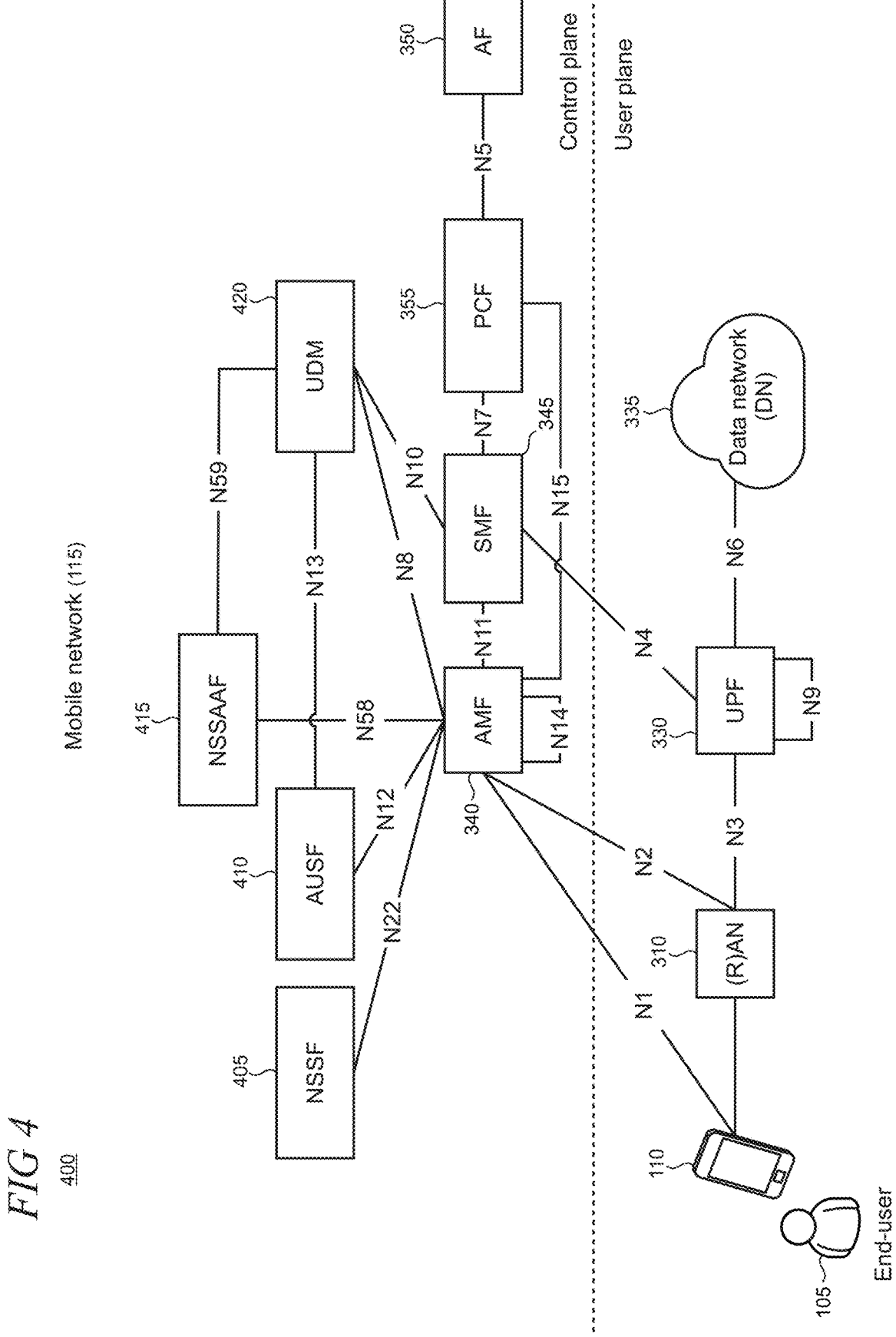
FIG. 4 shows an illustrative mobile network represented using a reference point architecture.

FIG. 4 shows the illustrative mobile network 115 as represented using a reference point architecture 400, as defined by 3GPP TS 23.501. This representation uses labeled point-to-point links to show the interaction that exists between two network functions or between a network function and an external functional module or network. In the reference point architecture under 3GPP, the naming convention for the data interfaces is given by the letter "N" and a number. Thus, for example, the N22 data interface provides a reference point between the AMF 340 and NSSF (Network Slice Selection Function) 405. The NSSF selects the set of network slice instances to accommodate the service request from a UE 110. When a UE requests registration with the network, the AMF sends a network slice selection request to NSSF with information on the preferred network slice selection. The NSSF responds with a message that includes a list of appropriate network slice instances for the UE.

The N12 data interface provides a reference point between the AMF 340 and AUSF (Authentication Function) 410. The AUSF performs authentication between UE 110 and the mobile network 115. The N58 data interface provides a reference point between the AMF and NSSAAF (Network Slice-Specific Authentication and Authorization Function) 415 that provides authentication and authorization services in a network slice that utilizes an AAA (authentication/authorization/accounting) server. The N8 data interface provides a reference point between the AMF and the UDM (Unified Data Manager) 420 that is responsible for access authorization and subscription management. Other point-to-point data interfaces may be instantiated in the reference point architecture 400 as shown in the drawing.

Figure 5:
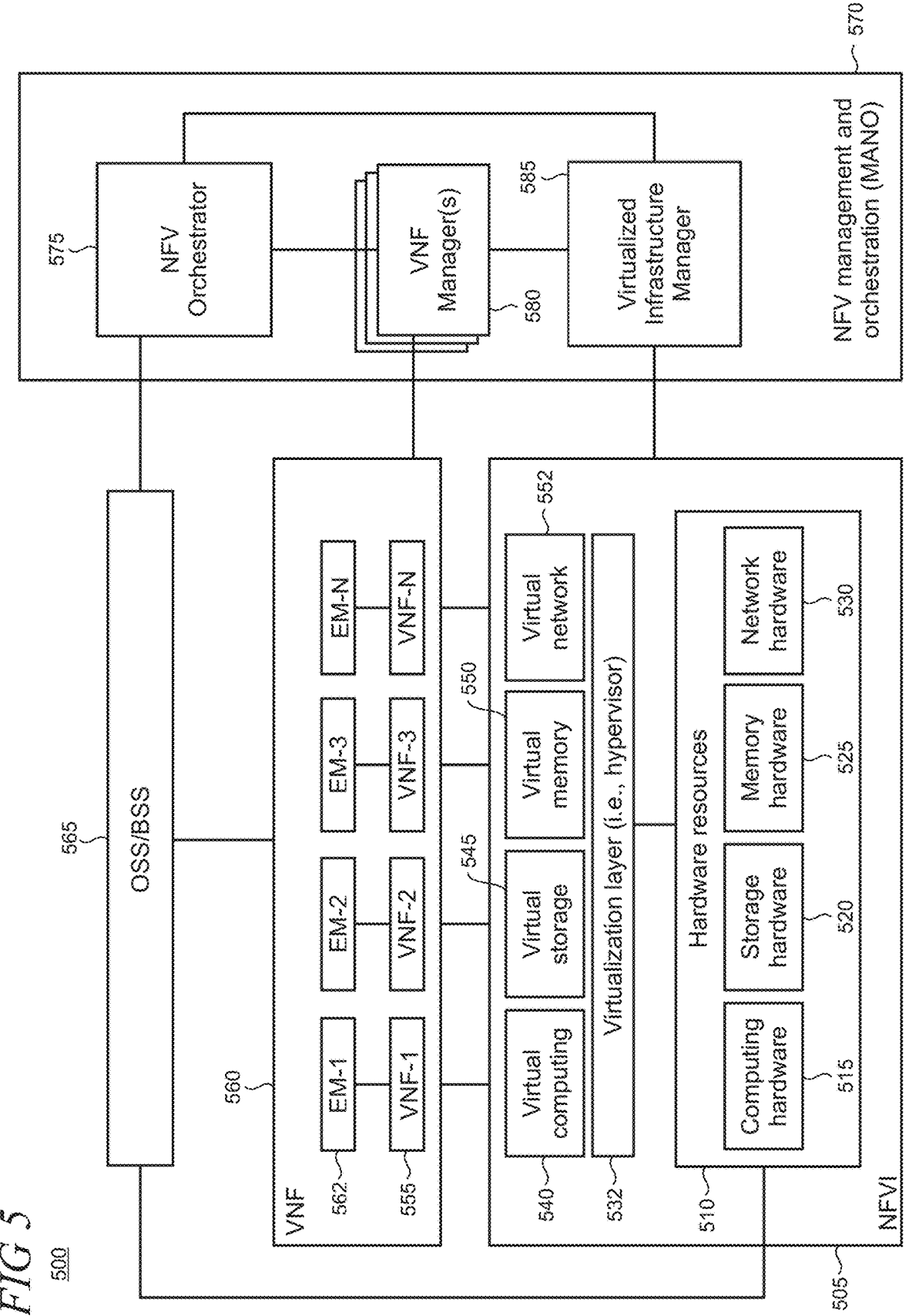
FIG. 5 shows an illustrative network functions virtualization (NFV) architectural framework.

FIG. 5 shows an illustrative network functions virtualization (NFV) architectural framework 500 that is described by the European Telecommunications Standards Institute (ETSI). The framework includes NFV infrastructure (NFVI) 505 that is an abstraction of physical hardware resources 510 including compute (i.e., computing servers) 515, storage 520, memory 525, and networking 530 as well as the hypervisor code that implements a virtualization layer 532 to thereby support respective virtualized counterparts, as respectively indicated by reference numerals 540, 545, 550, and 552.

A VNF (representatively indicated by reference numeral 555) in a VNF layer 560 of the framework 500 is a virtualization of an NF in a legacy non-virtualized mobile network. However, the functional behavior and state of an NF are largely independent of whether the NF is virtualized or not. The functional behavior and the external operational interfaces of a physically embodied NF and a VNF are expected to be the same. Element Management (EM) 562 performs typical management functionality for one or more VNFs, for example, managing faults, configurations, accounting, performance, security, and the like.

At the top of the framework 500 are operation support systems (OSS) and business support systems (B S S) that comprise the mobile network operator's back-end systems that manage, for example, networks, services, end-user customers, products, and orders. The OSS/BSS 565 communicates with an NFV MANO (management and orchestration) 570 which provides the framework for management and orchestration of all the resources in an NFV environment, including for example, deploying and operating the VNF to provide network services on the virtualized resources, and managing the lifecycle of VNF and NS instances to fulfill the business benefits for service providers. The NFV MANO interacts with EM 562 to manage the logical function and assure service levels of the VNFs in the VNF layer 560 spanning across the management of VNF fault, configuration, accounting, performance, and security.

The NFV MANO includes an NFV Orchestrator 575 that typically orchestrates one or more VNFs into network services and manages the lifecycle of those network services. The NFV Orchestrator interoperates with a VNF manager 580 that manages the lifecycle of VNF instances including, for example, instantiating, updating, upgrading, scaling, healing, and/or terminating a VNF. Each VNF instance is associated with a VNF manager.

A Virtualized Infrastructure Manager 585 manages the resources of the NFVI 505 and exposes the NFVI capabilities to upstream systems in the framework including the VNF Managers 580 and NFV Orchestrator 575. The Virtualized Infrastructure Manager collects performance and fault information for hardware, software, and virtualized resources and forwards performance measurement results and faults/events information relative to virtualized resources to the other systems.

The IMT-2020 (International Mobile Telecommunications-2020) reference standardizes the requirements of a 5G mobile network and was issued by the ITU (International Telecommunication Union) in 2015. While the ITU has concluded that the technological enhancements to 5G developed under 3GPP make it viable to achieve the general KPIs of 5G set by IMT-2020, monitoring network performance can still be challenging for operators. For example, mobile networks are typically heterogenous with the integration of underlying infrastructure from multiple different vendors in private- and public-cloud environments. Mobile operators can lack context for KPIs and can further lack a comprehensive understanding of a KPI's lineage including all of the underlying data interfaces and other KPIs that have a causal or correlated relationship to the KPI of interest. The mobile operator may not fully understand how a KPI is originated or calculated, nor how it may be meaningful to the operations of the mobile network. Compounding these difficulties is that mobile networks typically have dynamic deployment characteristics in which network configurations can change based on network conditions (e.g., traffic loading), maintenance requirements, and the accommodation of new service offerings and device types.

Figure 6:
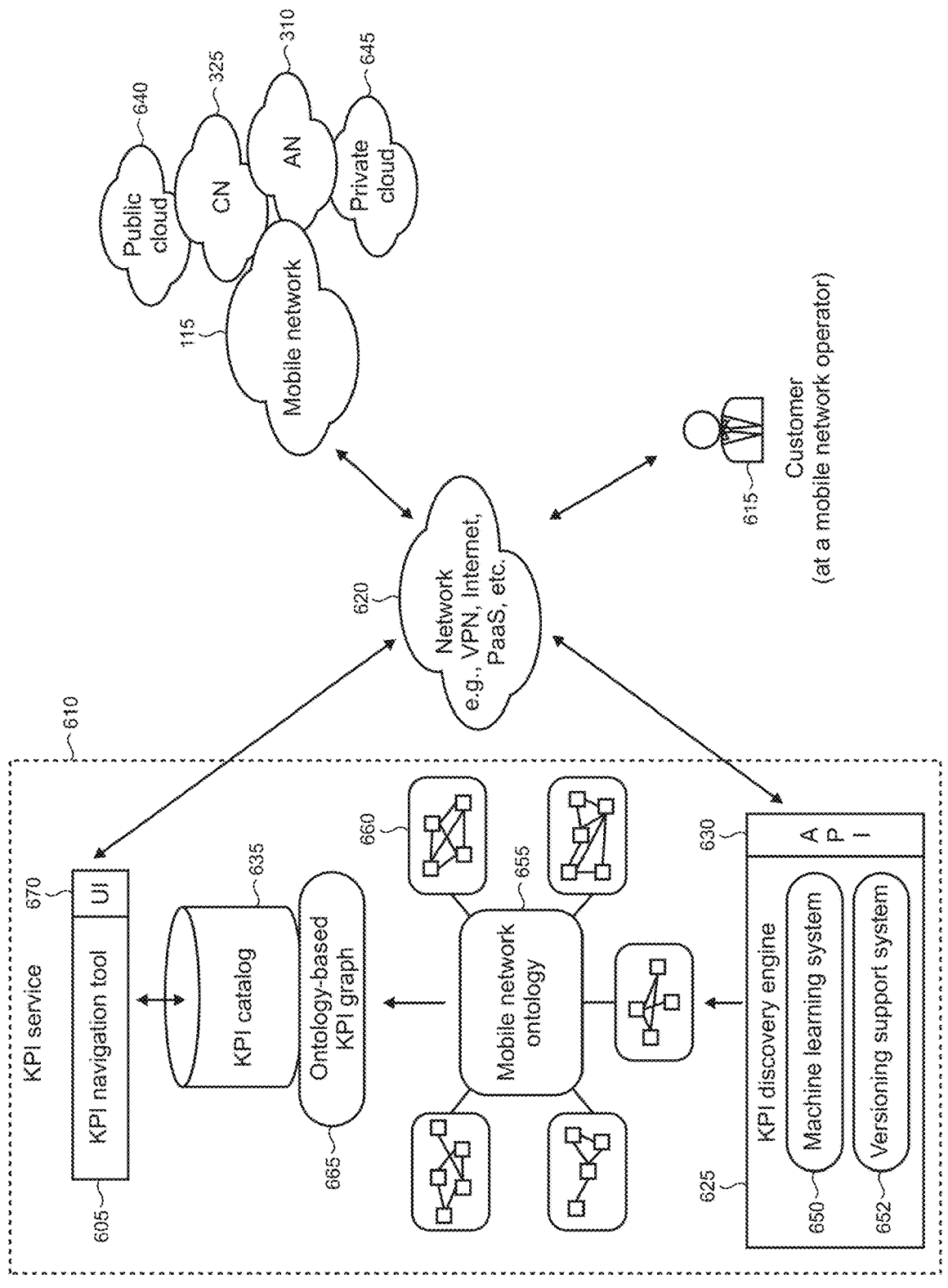
FIG. 6 shows illustrative interactions among a mobile network operator customer, a mobile network, and a key performance indicator (KPI) service that supports a KPI discovery engine, KPI catalog, and KPI navigation tool.

The present KPI navigation tool may beneficially address these technical problems for mobile operators. As shown in FIG. 6, a KPI navigation tool 605 may be supported by a KPI service 610. The service may be implemented, for example, as a cloud-based service offering that can be accessed by a customer 615 over a communications network 620 such as a virtual private network (VPN), the Internet or other public networks, Platform as a Service (PaaS) network, or other suitable network.

The KPI service 610 includes a KPI discovery engine 625 configured with an application programming interface (API) 630 or other suitable interface supporting interactions with the mobile network 115 to obtain appropriate data to ontologically characterize the network and generate a KPI catalog 635. As shown, the mobile network may include public (e.g., hyperscaler) and/or private clouds 640 and 645 providing infrastructure for either or both CN 325 and AN 310 networks. The KPI discovery engine can be configured to reach across the entire extent of the infrastructure through the API. The engine may further be configured to include a machine learning system 650 that is described in more detail in the text accompanying FIGS. 20, 21, and 22 below.

The KPI discovery engine 625 is arranged to generate a mobile network ontology 655 that may be dynamically populated with suitable data to reflect changing characteristics of the network as deployed. The mobile network ontology can be constituted from sub-ontologies, or self-contained and reusable ontology modules, in some implementations of the present principles, as representatively indicated by reference numeral 660. The mobile network ontology is a structured, machine-readable data model that models the concepts in the domain of mobile networks to thereby provide a framework for objects (i.e., classes), relationships, and attributes that define the KPIs for the network. The ontology provides a standardized semantic representation for data collected from the mobile network domain and relationships among the data. An ontology-based KPI graph 665, for example a Bayesian network, may be extracted from the mobile network ontology 655 to represent data in the catalog 635 about specific instances of KPIs and associated relationships in a given deployed network.

Figure 7:
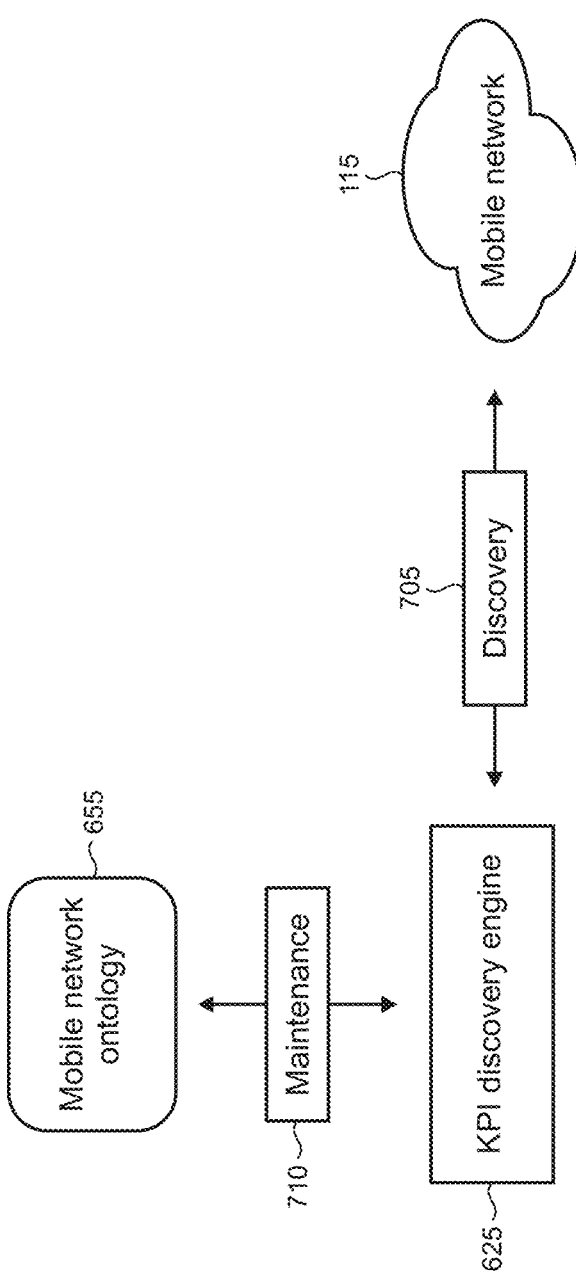
FIG. 7 shows illustrative maintenance and discovery functionalities supported by a KPI discovery engine.

As indicated by reference numeral 705 in FIG. 7, the KPI discovery engine 625 performs discovery of KPIs when generating the mobile network ontology 655 to characterize the mobile network 115. The KPI discovery engine, in an illustrative embodiment, also performs maintenance 710 of the ontology. The maintenance includes implementing improvements in the ontological representation of a mobile network, typically in a dynamic and continuous manner, to reflect changes and updates in mobile network domain datasets. In addition, the maintenance includes refining the ontologies to reflect changes in deployment of network topologies as underlying infrastructure is updated and new services are offered and old services are retired.

Figure 8:
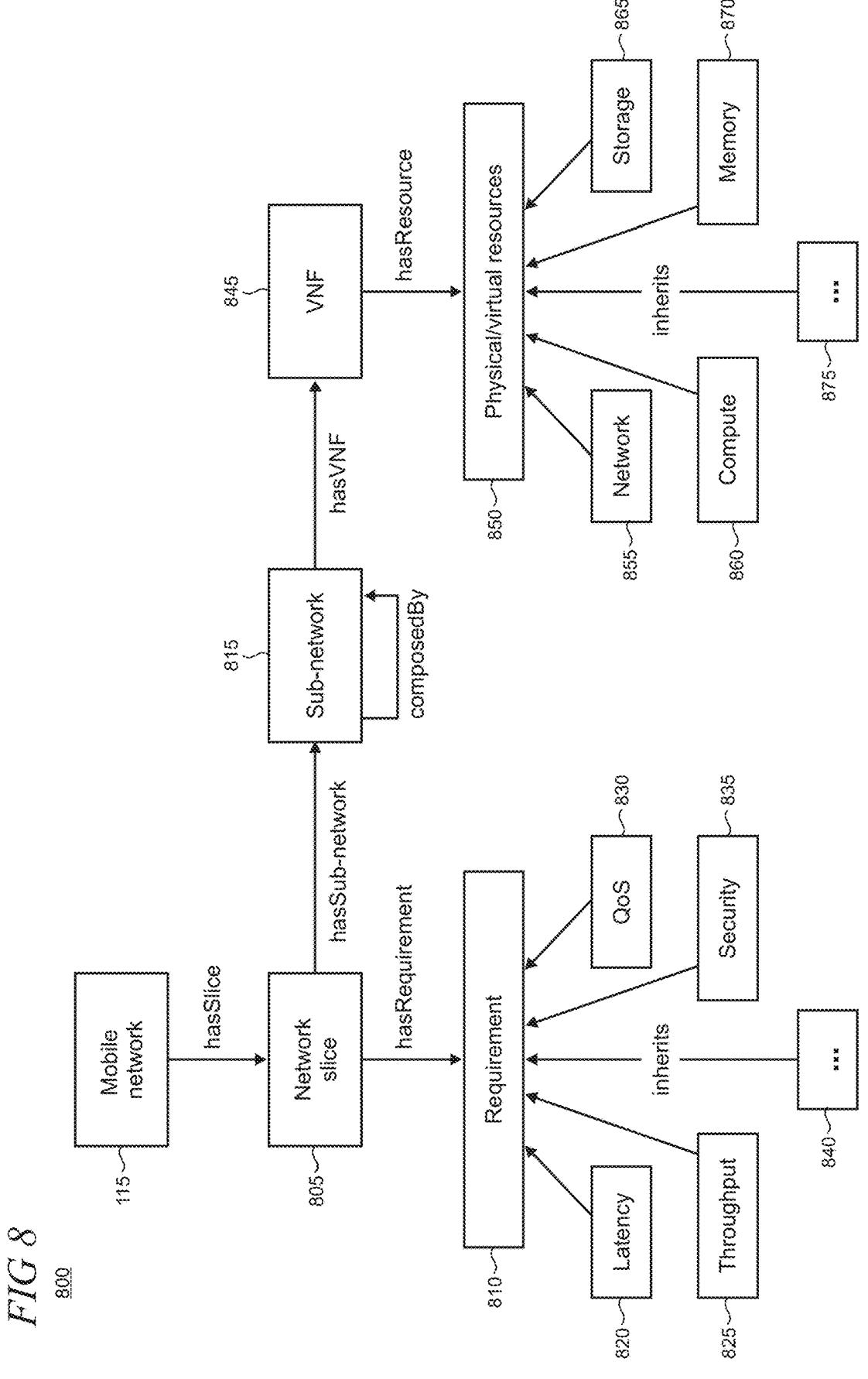
FIG. 8 shows an illustrative generalized mobile network ontology.

FIG. 8 shows an illustrative generalized mobile network ontology 800 that highlights the network slicing concept for the mobile network 115 as shown in FIG. 2 and described in the accompanying text. It is emphasized that the ontology 800 is shown as a simplified representation of only a portion of a typical mobile network for highlighting the present principles. The ontology includes classes shown by rectangles and relationships shown by arrows.

A given network slice 805 has specific requirements, represented by the requirement class 810, which are accomplished by one or more sub-networks 815. Requirements may include various metrics such as latency 820, throughput 825, quality of service (QoS) 830, security 835, or other suitable requirement metric 840. A sub-network has one or more VNFs 845 running on top of physical and/or virtual resources 850. The VNF class may include various types of resources to support the mobile network slice, including for example, but not limited to, network 855, compute 860, storage 865, memory 870, or other suitable resource 875.

FIG. 9 shows illustrative specific examples of classes and relationships that may be used when generating mobile network ontologies, arranged in accordance with the present principles, to create ontological representations of 4G and/or 5G networks. As shown, exemplary classes are organized by categories including collection 905, system 910, equipment 915, location 920, measurable 925, and entity-properties 930. Exemplary relationships are indicated by reference numeral 935. The classes and relationships shown in FIG. 9 are intended to be illustrative and not an exhaustive listing. Ontology-based formal models using the classes and relationships in FIG. 9 may be utilized to generate a comprehensive set of entries in the KPI catalog 635 (FIG. 6) for a given mobile network (e.g., mobile network 115 in FIG. 1).

Returning to FIG. 6, the navigation tool 605 provides a user interface (UI) 670 to expose the KPI catalog 635 to the customer 615 over the network 620. Using the navigation tool, the customer can browse, search for, and discover KPIs of interest in the catalog and obtain understanding of the broader context for the KPIs. Such context includes connections among the KPIs and their underlying data interfaces to help the customer bridge gaps in knowledge so that KPIs are not viewed in isolation.

In some implementations, the KPI catalog 635 is curated, using automated or human-sourced methodologies, or combinations thereof, to tailor the cataloged entries to a particular mobile network deployment to increase their relevancy. For example, curation can be implemented by application of some pre-determined criteria to filter or sort KPIs based, for example, on applicable SLA requirements, regulatory frameworks, or other factors. The KPI catalog can be organized by category such as those defined in 3GPP TS 28.554 including accessibility, integrity, utilization, retainability, availability, and mobility. Other suitable organizational taxonomies may be applied to the KPI catalog as needed to meet the requirements of a particular implementation.

A versioning support system 652 in the KPI discovery engine deals with changes in ontological representations by enabling semantic mapping across different versions. For example, a mobile network ontology is typically representable in multiple different versions as new technologies are deployed and new industry standards are introduced and adopted. The different versions are typically expected to include modified terminology and other changes having a wide-ranging scope from minor alternation, to intermediate adjustment, to wholesale variation.

Figure 10:
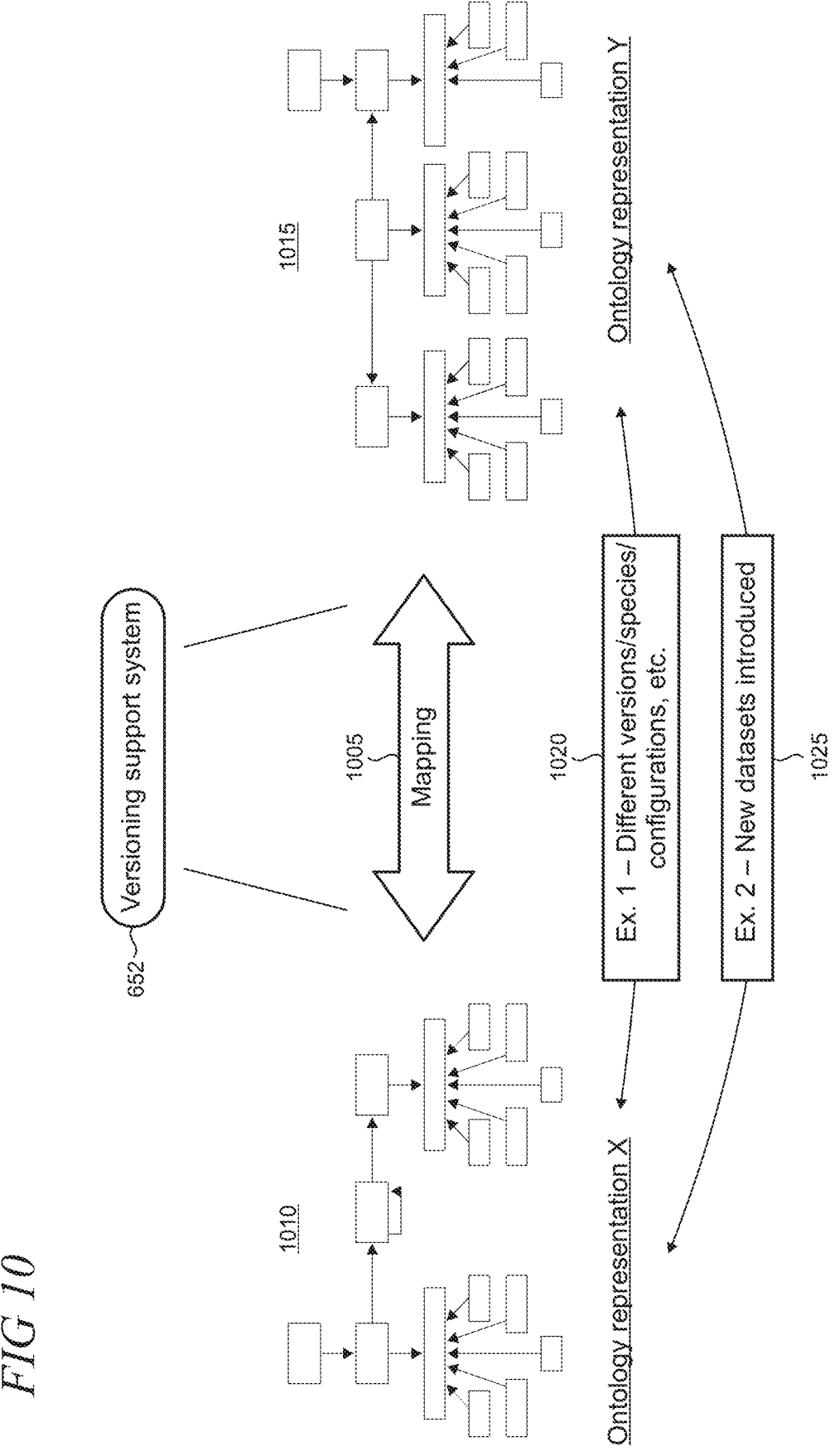
FIG. 10 shows a mapping functionality exposed by an illustrative versioning support system that bridges between different representations of an ontology.

FIG. 10 shows a mapping functionality 1005 exposed by the versioning support system 652 that enables bridging between different ontology representations 1010 and 1015. In an illustrative example, the ontology representations reflect different versions, species, or configurations of a mobile network, as indicated by reference numeral 1020. Ontology representations X and Y may reflect the transitioning of a mobile network from 4G to 5G technologies and infrastructure (i.e., different network species), for example. In another illustrative example, the ontology representations reflect the introduction of new or different datasets, as indicated by reference numeral 1025. Without versioning support, the changes or adaptations needed to properly maintain an ontology would get missed and the derived KPI graph would thus be inaccurate and/or incomplete.

Figure 11:
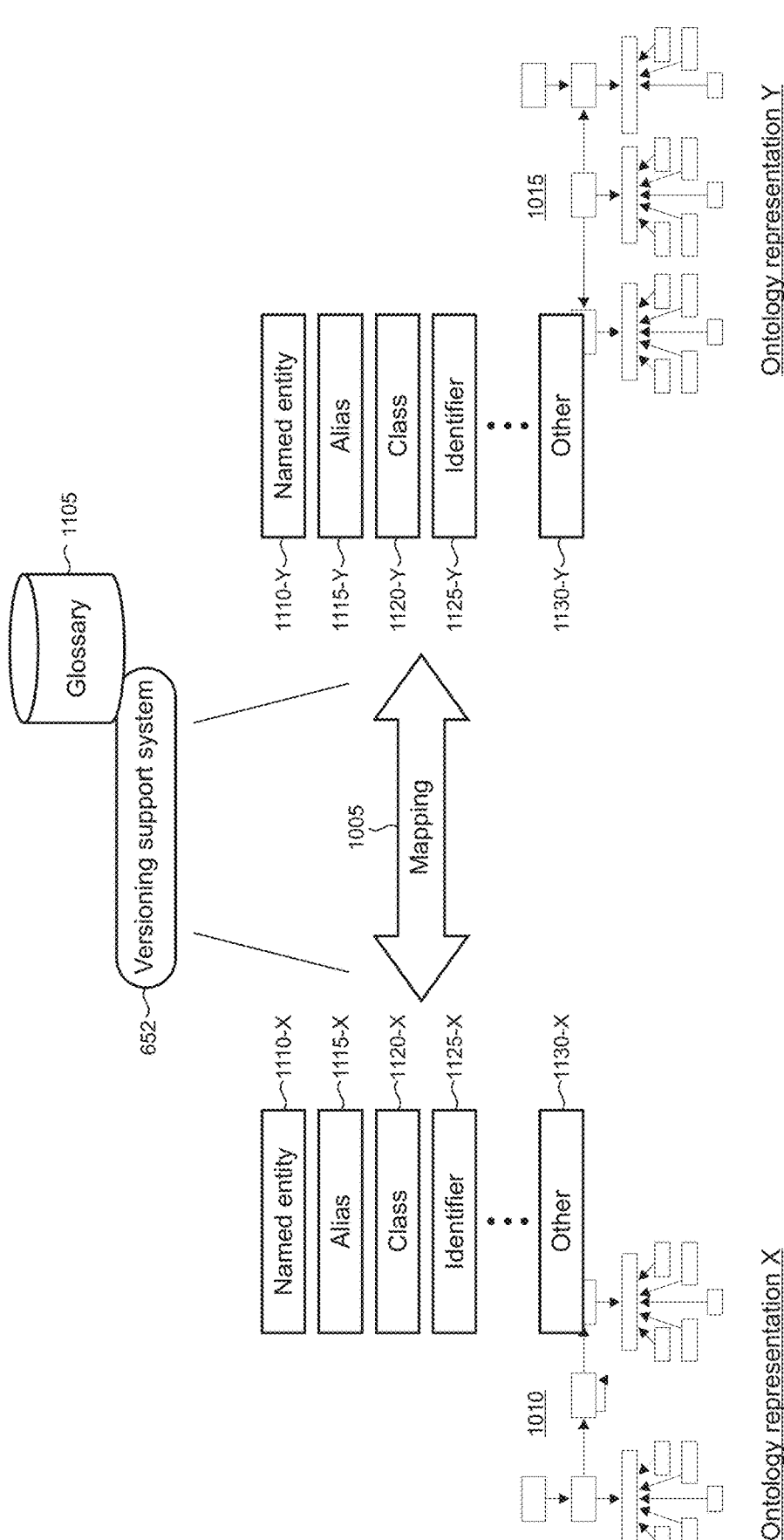
FIG. 11 shows an illustrative embodiment of a versioning support system using a glossary to map between ontology terms in different representations of an ontology.

FIG. 11 shows an illustrative embodiment of the versioning support system 652 that implements a glossary 1105 to map between ontology terms in the different ontology representations 1010 and 1015. The terms illustratively include named entity 1110, alias 1115, class 1120, and identifier 1125. Other suitable terms 1130 are also mappable in a given implementation. In alternative implementations, the glossary is replaced or supplemented using a list, thesaurus, or taxonomy. A machine learning system is also employable in the mapping process in some scenarios.

The versioning support system 652 performs a look-up of an ontology term in the glossary to obtain a relevant formal description (i.e., based on a logical framework such as an ontology language) of definitions of ontological classes and relations. This enables a representation of a meaning of the concepts to be machine processable to enable semantic mapping from a term in the original ontology X to a corresponding term in the evolved ontology representation Y.

Figure 12:
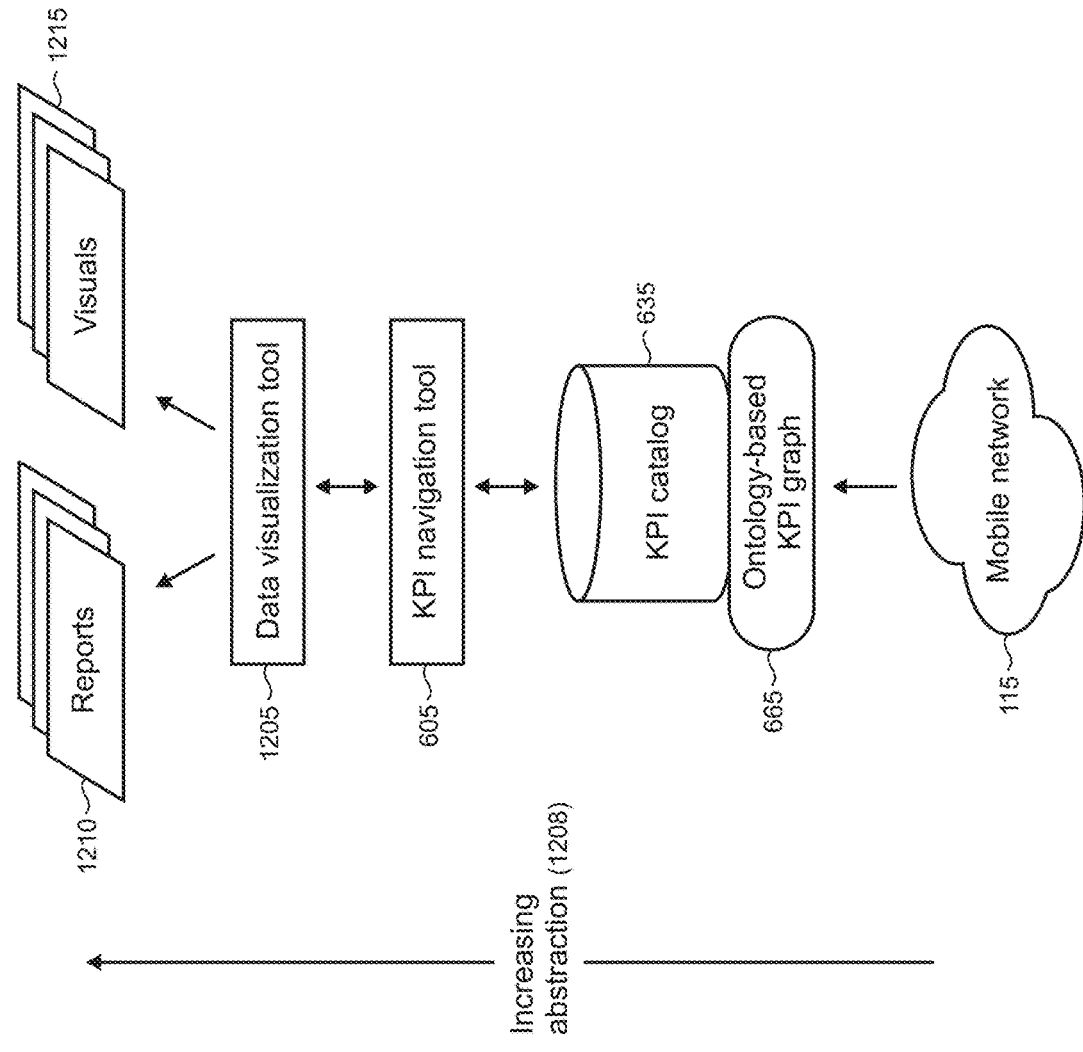
FIG. 12 shows illustrative interoperability between a KPI navigation tool and a data visualization tool.

Additional functionality may be provided by the KPI navigation tool 605 by configuring it for interoperability with a conventional data visualization tool 1205 as illustratively shown in FIG. 12. One illustrative example of an appropriate data visualization tool includes POWER BI® provided by Microsoft® Corporation. Such interoperability between the KPI navigation and data visualization tools may facilitate additional abstraction for the mobile network 115, as indicated by reference numeral 1208, which may advantageously enhance focus and reduce complexity in mobile network performance analyses. The KPI navigation and data visualization tools can be operatively arranged to produce reports 1210 and/or visuals 1215 from the KPI catalog 635 based on the ontology-based KPI graph 665. The reports and/or visuals can be standardized or customized to leverage the specific capabilities of the navigation tool, for example, its ability to discover links that span large distances in the KPI graph.

Figure 13:
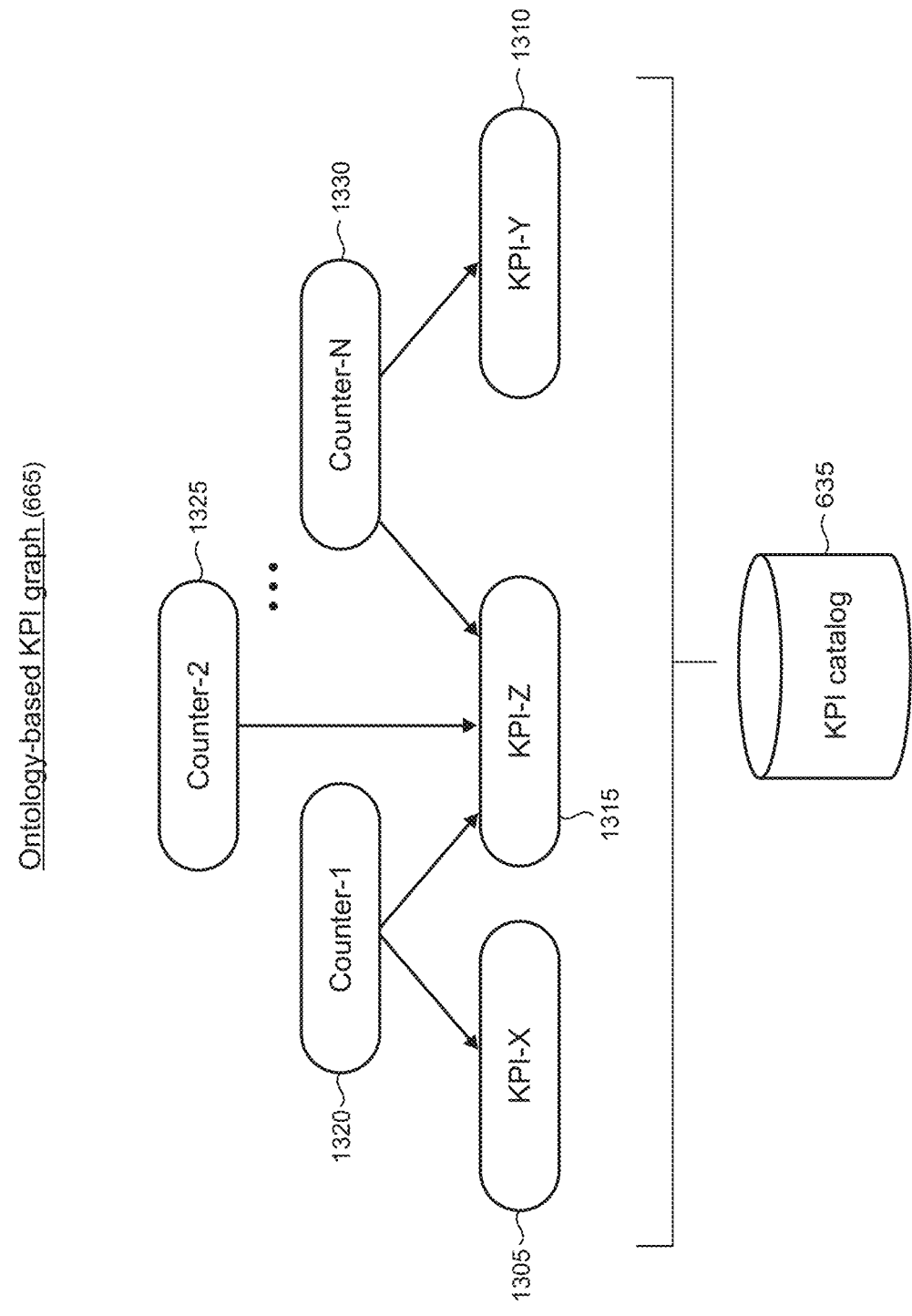
FIG. 13 shows an illustrative KPI graph that may be included in a KPI catalog.

FIG. 13 shows an illustrative example of a KPI graph 665 that may be extracted from the mobile network ontology 655 (FIG. 6) and included in the KPI catalog 635. The exemplary KPI graph shown in the drawing is simplified to aide in clarity of exposition and includes three KPIs— X, Y, and Z— as respectively indicated by reference numerals 1305, 1310, and 1315. The graph also includes counters 1, 2, . . . N, as respectively indicated by reference numerals 1320, 1325, and 1330. The arrows show relationships between the counters and KPIs.

Counters are simple indices that increase every time an event occurs in the mobile network 115 (FIG. 1), such as the number of handovers carried out properly or the number of allocations for a particular transmission channel. Given a fixed interval of analysis, called Repetition of Period (ROP), counters measure the number of times that such events occurred. KPIs are derived through mathematical expressions which typically consider several single counters. Thus, counters provide historic values that show statistics associated with KPIs accumulated for a specific time range.

FIG. 14 shows an illustrative screenshot 1400 of the UI 670 exposed by a navigation tool 605 (FIG. 6). In this example, the customer 615 has browsed the KPI catalog 635 and selected display of high value metrics which include information from the KPI graph 665 shown in FIG. 13 and described above. The graph is represented in visual form with KPI names and counters listed on the left side. Counter values (shown grayed out) are displayed to the right of the KPI and counter listing. Instances of a visual language icon 1405 and 1410 may be used to inform the customer that counter-1 and counter-N are linked in some way and/or that additional information is available about the counters.

The design of visual language icons typically varies by implementation. Different numbers and types of visual icons can be utilized. A unique icon may be utilized for each 3GPP KPI category, for example. In FIG. 14, therefore, counter-1 and counter-N are shown as being related through association with a common KPI category by use of the common visual language icon. In this particular visual language design, when the customer 615 (FIG. 6) selects the visual language icon instances 1405 and 1410, additional information about the counter is exposed on the UI. The particular information that is revealed and the visual design used to express that information can vary by implementation. For example, and not by way of limitation, clicking on a visual language icon can show relationships among the counters in some suitable visual manner.

FIG. 15 shows an exemplary navigation path 1500 among illustrative KPI categories that is facilitated by the KPI navigation tool 605 (FIG. 6). The navigation path can comprise various navigation actions including, for example, roll up, drill down, correlation (e.g., of KPI metrics/data), and trend visualization. As shown, illustrative categories include, but are not limited to availability 1505, accessibility 1510, integrity 1515, retainability 1520, and mobility 1525. The navigation path begins at the availability category, traverses the accessibility, integrity, and retainability categories, and ends at the mobility category. It is emphasized that the navigation path is exemplary and could be expected to be utilized as part of a typical user experience when verifying network performance. The navigation path provides a concise view of network performance and changing network conditions by utilizing a manageable number of KPIs having relevance to the user experience.

The navigation path can be further expected to enable an organized and comprehensive approach to network evaluation and verification by consolidating many metrics to thereby facilitate understanding of vital performance indicators for reporting and analysis. Accordingly, unproductive efforts on collecting and analyzing low-relevance metrics are reduced so that customers can focus on problem solving and the implementation of network performance improvements.

Figure 16:
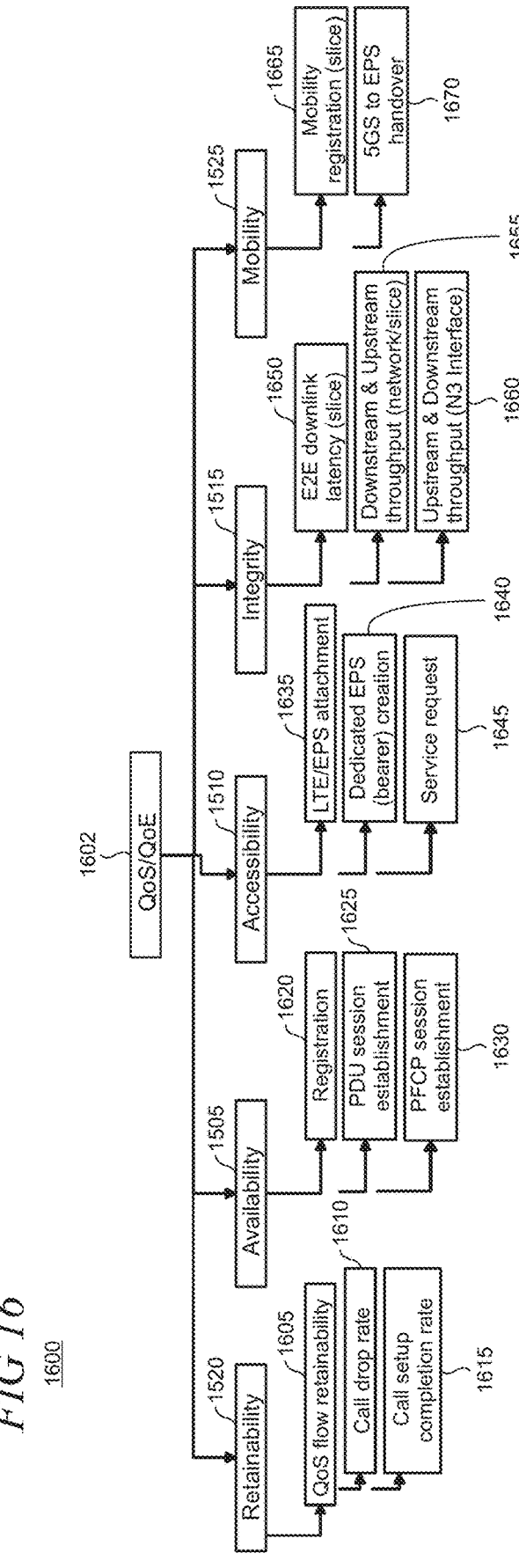
FIG. 16 shows an illustrative taxonomy of KPIs arranged by category.

FIG. 16 shows an illustrative taxonomy 1600 of KPIs arranged by category for a given QoS and/or QoE (quality of experience) 1602. The KPIs included in the taxonomy are illustrative and not intended to be an exhaustive listing of all potentially usable KPIs for any given implementation. The KPI categories are partially or wholly distinct from standardized categories in some implementations. In others, exemplary KPI categories overlap with categories defined, for example, by 3GPP TS 28.544.

As shown, the retainability category 1520 includes KPIs dealing with QoS flow retainability 1605, call drop rate 1610, and call setup completion rate 1615. The availability category 1505 includes KPIs dealing with registration 1620, PDU (protocol data unit) session establishment 1625, and PFCP (packet forwarding control protocol) session establishment 1630.

The accessibility category 1510 in the taxonomy 1600 includes KPIs dealing with LTE/EPS (evolved packet system) attachment 1635, dedicated EPS (bearer) creation 1640, and service request 1645. The integrity category 1515 includes KPIs dealing with end-to-end downlink latency 1650 (e.g., on a slice basis), downstream and upstream throughput 1655 (e.g., on a network and/or slice basis), and downstream and upstream throughput 1660 (e.g., at an N3 interface between a RAN and UPF). The mobility category 1525 includes KPIs dealing with mobile registration 1665 (e.g., for a slice) and 5GS (5G system) to EPS handover 1670.

FIG. 17 shows an illustrative set 1700 of visual language icons that is usable in some applications of the present principles. The visual language icons represent ideas, objects, information, narratives, contexts, and/or actions and typically provide communication at a glance in an interactive and engaging manner while highlighting important information and key data. The visual language underlying the icon set comprises various design elements that are selectable from, for example, color; font; and graphical elements such as lines, gradients, shadows, shading, highlight, and perspective; motion/animation; alignment; and spacing; and various combinations thereof. Size and details can vary by implementation but in general the visual language icons avoid unnecessarily busy or complex presentations that may cause distractions or confusion.

While each visual language icon is unique and non-redundant in typical applications, the set as a whole will be cohesive and share common stylistic properties. The icons provide an efficient means of communication as a component of a highly functional user interface that reduces the cognitive load on customers while effectively guiding them through a user experience while navigating KPIs.

The visual language icons bucket certain KPIs into the illustrative categories discussed above including accessibility, integrity, retainability, and mobility. An accessibility visual language icon 1705 relates to KPIs that enable all end-users 105 (FIG. 1) to have the same access and experience when utilizing the mobile network 115, as defined by 3GPP metrics, including QoS. Mobile operators typically consider accessibility as an important indicator. Accessibility optimization is sought to ensure effective service for end-users, equipment (e.g., UE, IoT devices, etc.), and systems that interact with their mobile networks.

An integrity visual language icon 1710 relates to KPIs that capture end-user sentiments regarding the perceived equality of mobile network services delivery. End-users typically expect services to be provided without bias in an even-handed manner without excessive impairments. For example, KPIs dealing with throughput and latency, that can impact perceptions of honesty, purity, and justice, are covered in the integrity category in some implementations.

A retainability visual language icon 1715 deals with KPIs relating to customer satisfaction and churn. Retainability is defined by metrics that capture an end-user's desires for inclusion and embeddedness within the social constructs supported by a mobile network. As mobile network topological properties can be expected to impact churn probability—the probability of an end-user switching from one mobile network provider to another—operators are generally motivated to leverage the predictive power of retainability KPIs.

A mobility visual language icon 1720 relates to KPIs used to measure the performance of a mobile network in handling movement of users and equipment while maintaining service at some predefined QoS level. The concepts of mobility are not only applicable to mobile UE in a traditional sense, but also to IoT devices, drones, and autonomous vehicles, for example, that are anticipated to be increasingly deployed, particularly as 5G infrastructure becomes more common.

FIG. 18 shows the retainability visual language icon 1715 that is arranged to expose actionable elements to the customer. It may be appreciated that other visual language icons are configurable to include actionable elements in a similar manner. The visual language icon, in this illustrative example, includes one or more graphical elements that are individually actionable by the customer to launch various different functionalities. For example, and without limitation, the launchable functionalities include one or more of identification of KPI data sources, provision of alerts, identification of trends, and support for correlation among KPIs and/or underlying data.

As shown, the visual language icon 1715 illustratively includes four actionable elements, as respectively identified by reference numerals 1805, 1810, 1815, and 1820, each of which launching a different functionality when actioned. In an illustrative example, the actionable elements are arranged to be highlighted in response to a mouse-over action (i.e., hover) performed using the UI of the navigation tool 605 (FIG. 6), as indicated by reference numeral 1825. The customer can then click on the highlighted element to launch the respective functionality.

Figures 19A, 19B:
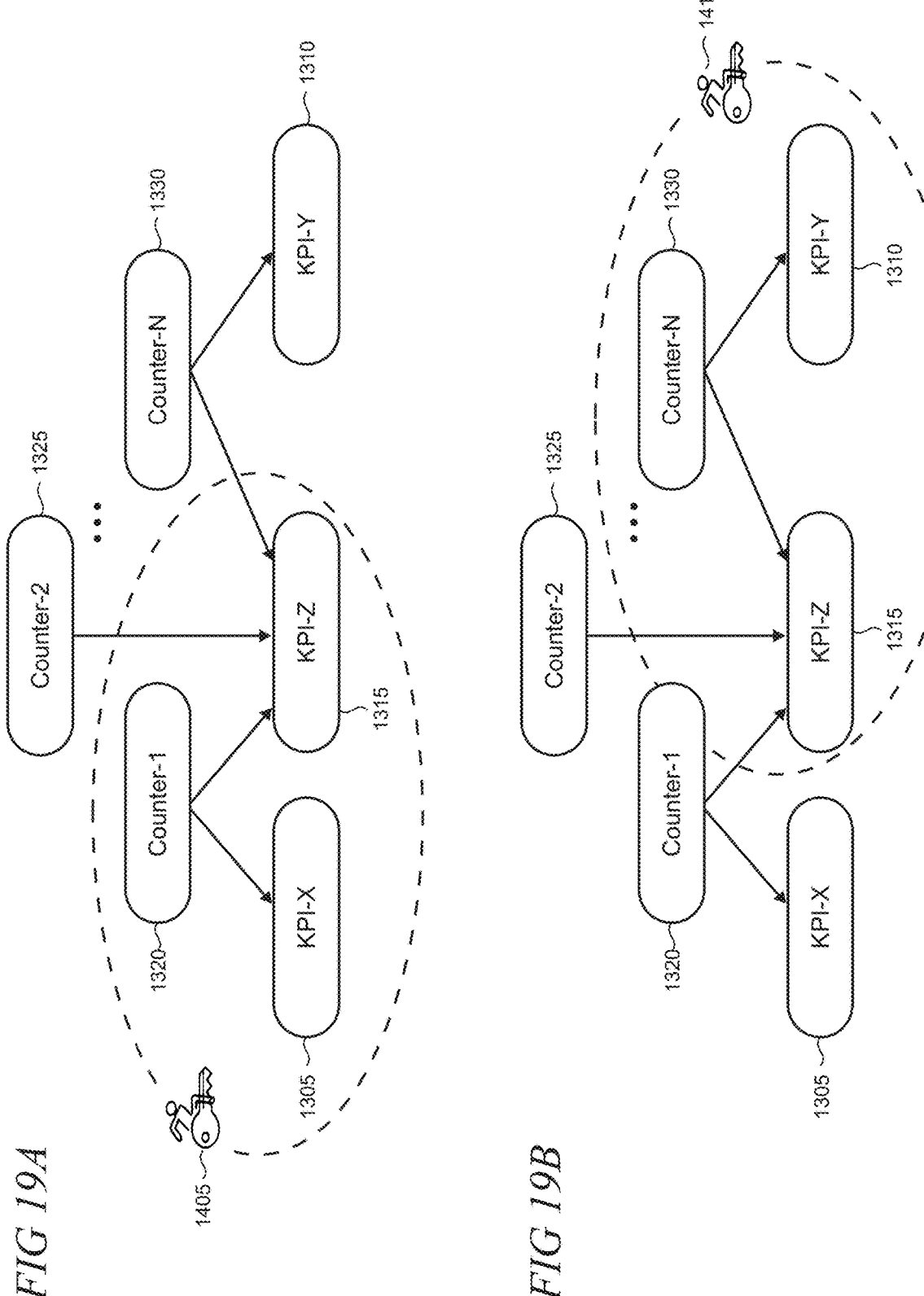
FIGS. 19A and 19B show illustrative examples of relation discovery using visual language icons.

FIGS. 19A and 19B shows illustrative examples of relationship discovery using visual language icons. As shown in FIG. 19A, when the customer 615 (FIG. 6) selects the visual language icon 1405 associated with counter-1 (indicated by reference numeral 1320), the UI 670 can visually expose information that indicates that counter-1 is associated with both KPI-X (1305) and KPI-Z (1315). Similarly, as shown in FIG. 19B, when the customer selects visual icon 1410 associated with counter-N (1330), the UI can visually expose information that indicates that counter-N is associated with both KPI-Z (1315) and KPI-Y (1310). It is emphasized that the relationship discovery provided in the examples in FIGS. 19A and 19B is illustrative and simplified for clarity in exposition. It may be appreciated that relationships covering any appropriate distance in a given KPI graph may be expressed using a visual language icon on the UI.

Figure 20:
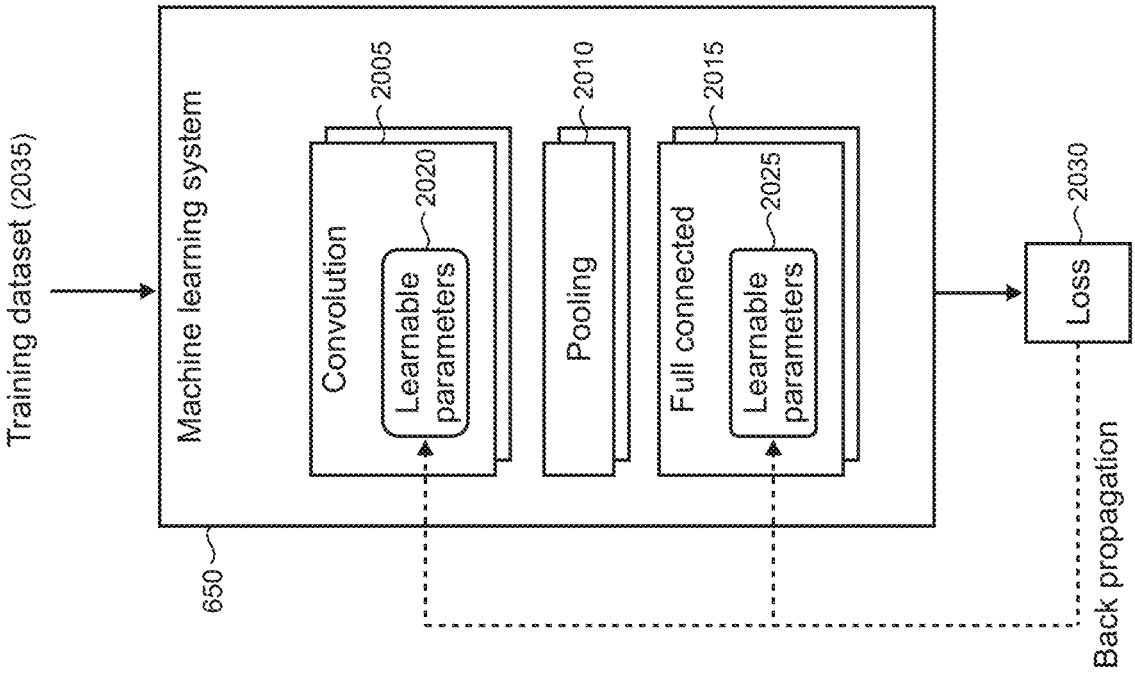
FIG. 20 shows an illustrative machine learning system in which learnable parameters are adjusted based on training data.

As noted above in the text accompanying FIG. 6, the KPI discovery engine 625 can include a machine learning system 650. FIG. 20 shows an illustrative example of the machine learning system 650 that is implemented using a neural network such as a convolutional neural network. A neural network may be described as a set of different layer types including a convolution layer 2005, pooling layer 2010, and fully connected layer 2015. Multiple instances of layers of each type may be utilized in the machine learning system.

The convolution layer 2005 and fully connected layer 2015 include respective learnable parameters 2020 and 2025 that comprise weight matrices in the layers. It may be appreciated that an objective in a neural network is to learn the values of a parameter using backpropagation during training to minimize the value of a loss function 2030 based on a known training data set 2035. The weight matrices contribute to the neural network model's predictive and/or classification powers, and the learnable parameters are changed during backpropagation.

Figure 21:
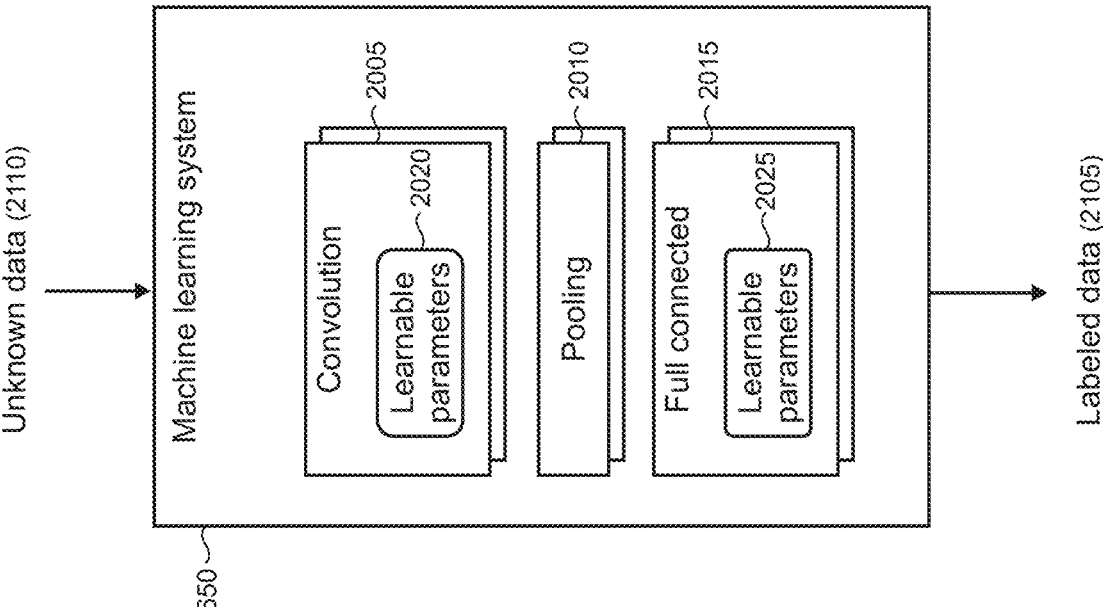
FIG. 21 shows an illustrative machine learning system that is arranged to provide labeled data supporting mobile network ontologies and KPI graphs.

FIG. 21 shows an illustrative example of the machine learning system 650 that is arranged to provide labeled data 2105 to support the generation of mobile network ontologies and KPI graphs, as discussed above, from unknown data 2110 presented at the input. Typically, the unknown data is encoded using feature vectors to represent ontological classes and relationships shown in FIG. 9 and described above. The algorithms implemented in the machine learning system can vary by implementation, and processes used to acquire suitable and correct machine learning algorithms can be iterative.

For KPI extraction, a convolutional neural network may be particularly well suited because KPIs typically comprise a changing value over a time series. As a convolutional neural network can input two-dimensional (2D) feature vectors and process them in 2D, a matrix can be used to represent a lagged time series as an input vector. Other learning methods may also be utilized, such as recurrent neural networks and hidden Markov Models.

FIG. 22 shows an illustrative example of the machine learning system 650 that is arranged to provide curated ontological datasets 2205 to support the generation of mobile network ontologies and KPI graphs. In this example, new ontological datasets 2210 are provided as an input to the machine learning system. The machine learning system performs automated scanning of the new datasets to determine which of the input datasets have relevance to an existing ontological model. In addition, the machine learning system discovers functional dependencies in the datasets which are provided as curated output from the system.

The automated operation of the machine learning system 650 to provide curated ontological datasets advantageously provides a reduction in dataset count, as indicated by reference numeral 2215, to thereby lower operational overhead when constructing and maintaining a mobile network ontology. The curation further reduces a need for supervised learning and/or manual intervention with the learning model.

FIG. 23 is a flowchart of an illustrative method 2300 for service assurance that may be performed in accordance with the present principles. The method may be performed, for example, by a computer server supported by the KPI service 610 shown in FIG. 6 and described in the accompanying text. Unless specifically stated, methods or steps shown in the flowcharts and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

Block 2305 comprises generating an ontology of the mobile network comprising a structured machine-readable data model for network elements in the mobile network and data interfaces among the network elements. Block 2310 comprises extracting a key performance indicator (KPI) graph from the ontology, the graph providing a representation of KPIs for the mobile network and associated counters, located on the network elements, configured for recording events at the data interfaces.

Block 2315 comprises selecting a subset of the extracted KPIs and associated counters from the graph for inclusion in a catalog. Block 2320 comprises providing a navigation tool having a user interface, the navigation tool configured to facilitate browsing of the catalog by a user, the browsing including discovering relationships among the KPIs and associated counters.

FIG. 24 is a flowchart of an illustrative process 2400 that may be performed, for example, by a computer server supported by the KPI service 610 (FIG. 6). Block 2405 comprises implementing a machine learning system configured for creating a semantic data model of a software-defined mobile network, the semantic data model representing network elements in the software-defined mobile network and data interfaces among the network elements, the machine learning system comprising a multi-layer neural network. Block 2410 comprises training the semantic data model by inputting representations of a training dataset of network elements and interfaces into the machine learning system and adjusting weights in one or more layers of the neural network to minimize an error function at an output of the machine learning system.

Block 2415 comprises populating the semantic data model by inputting representations of an unknown dataset of network elements and data interfaces into the machine learning system to create labeled output. Block 2420 comprises utilizing the populated semantic data model to create a graph of KPIs applicable to the mobile network, the graph identifying ontological relationships for KPIs among specific instances of network elements and data interfaces in the software-defined mobile network.

FIG. 25 is a flowchart of an illustrative process 2500 that may be performed, for example, by a computer server supported by the KPI service 610 (FIG. 6). Block 2505 comprises instantiating a KPI discovery engine having an API through which the computing device is interoperable with a mobile network for which KPIs for the mobile network are discoverable, the mobile network being represented by a reference point architecture comprising network elements interoperating through data interfaces. Block 2510 comprises operating the KPI discovery engine to inspect reference points in the mobile network to determine relationships of counters associated with network elements with KPIs.

Block 2515 comprises, generating a catalog of selected KPIs in response to the inspecting. Block 2520 comprises exposing the catalog of selected KPIs through the UI.

Figure 26:
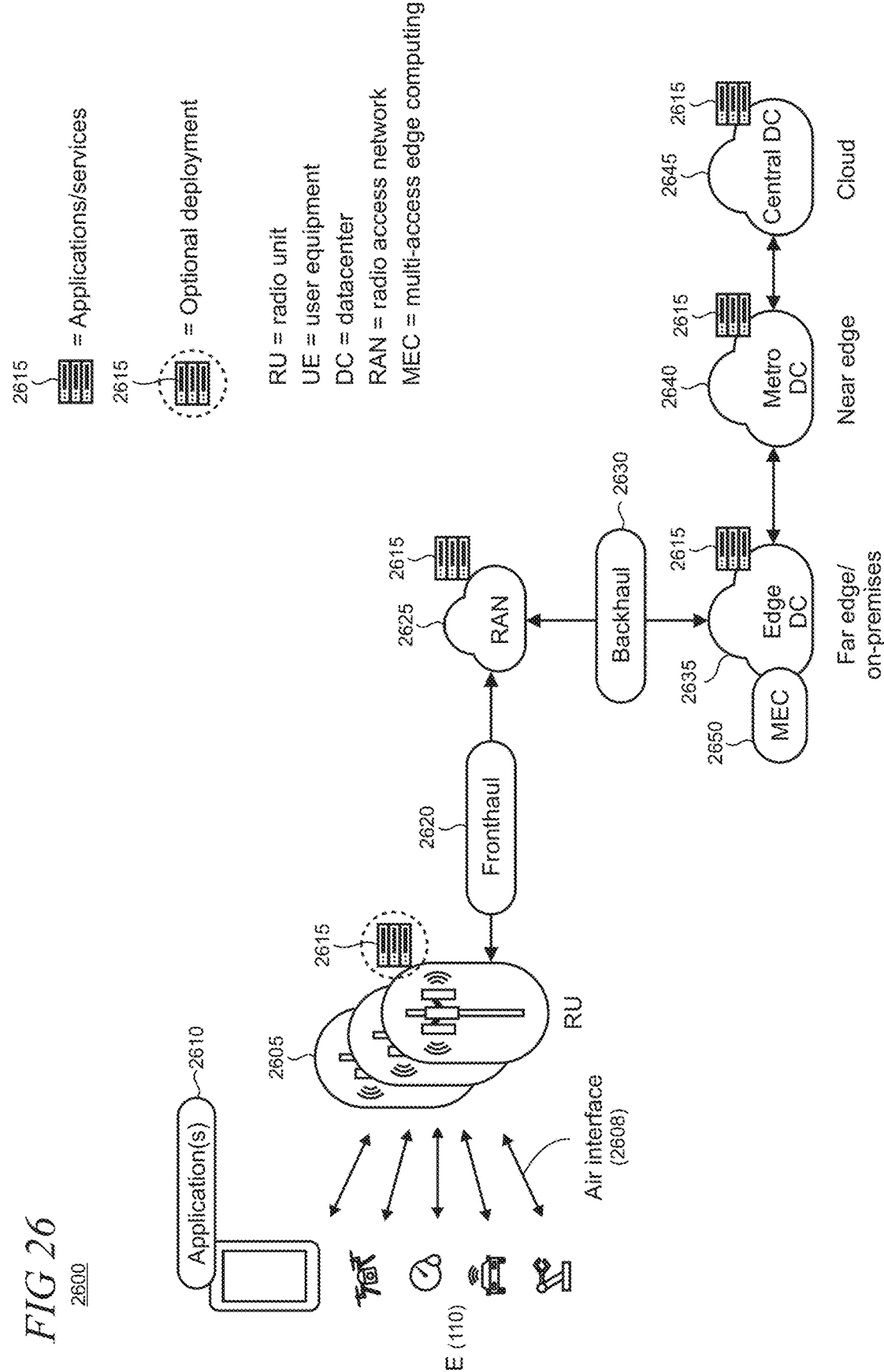
FIG. 26 shows illustrative physical infrastructure in a 5G network architecture.

FIG. 26 shows illustrative physical infrastructure in a 5G network 2600. Multiple instances of a radio unit (RU) 2605 are configured to interact with a diverse population of UE 110 over an air interface 2608. Each UE typically includes one or more local applications 2610 or client-side software/firmware component that is arranged to interface with one or more remote application servers, service providers, or other resources (collectively indicated by reference numeral 2615) and thus requires network connectivity to such remote facilities.

The RUs are coupled by the mobile fronthaul 2620 to a RAN 2625. The RAN is coupled by the mobile backhaul 2630 to one or more datacenters (DCs). In this illustrative example, the DCs comprise an edge DC 2635, a metro DC 2640, and a central DC 2645. In some networking literature, the edge DC is referred to as a far edge or on-premises DC. The metro DC is often referred to as a near edge DC, and the central DC is often referred to as the cloud. In some implementations, the edge DC supports multi-access edge computing (MEC) functions 2650.

The application servers 2615 are locatable at various points in the network architecture 2600 to meet technical requirements and traffic demands. Typically, the application servers will be physically located closer to the UE 110 in cases where latency is sought to be minimized. However, an operator's application server location criteria generally consider factors such as management ease, scalability, and security, among other factors. In some implementations, an operator optionally deploys application servers and other resources in the RAN 2625 or RU 2605, as indicated by the dashed circle in FIG. 26.

Figure 27:
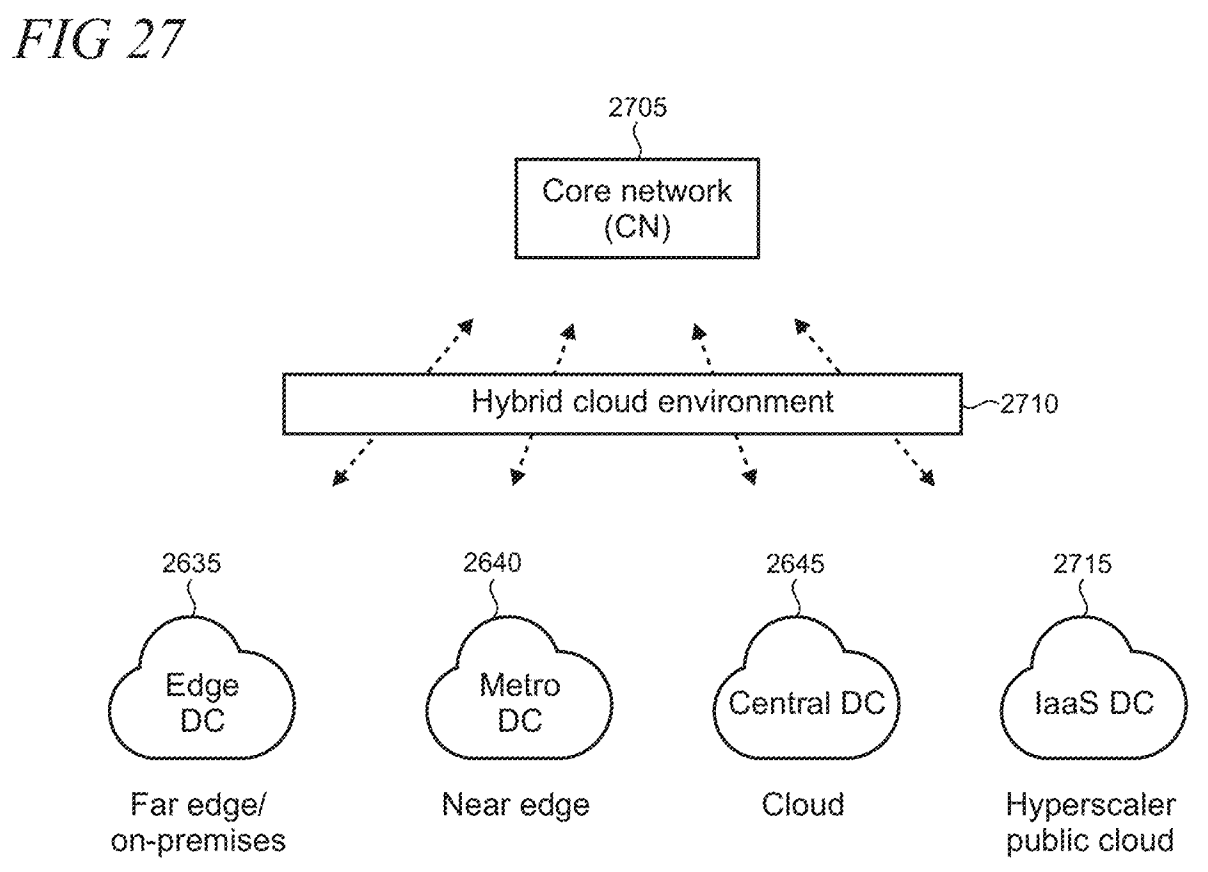

FIG. 27 shows an illustrative 5G core network (CN) 2705 that is implemented using a hybrid cloud environment 2710 that comprises a combination of private and/or public cloud networks. In this example, the edge DC 2635, metro DC 2640, and central DC 2645 are associated with a private cloud. A hyperscaler public cloud supports an IaaS (Infrastructure as a Service) DC 2715. It is emphasized that the present service assurance in 5G networks using a KPI navigation tool is able to be utilized in AN and/or CN portions of a mobile network as implemented in private, public, or hybrid cloud-computing networks.

Figure 28:
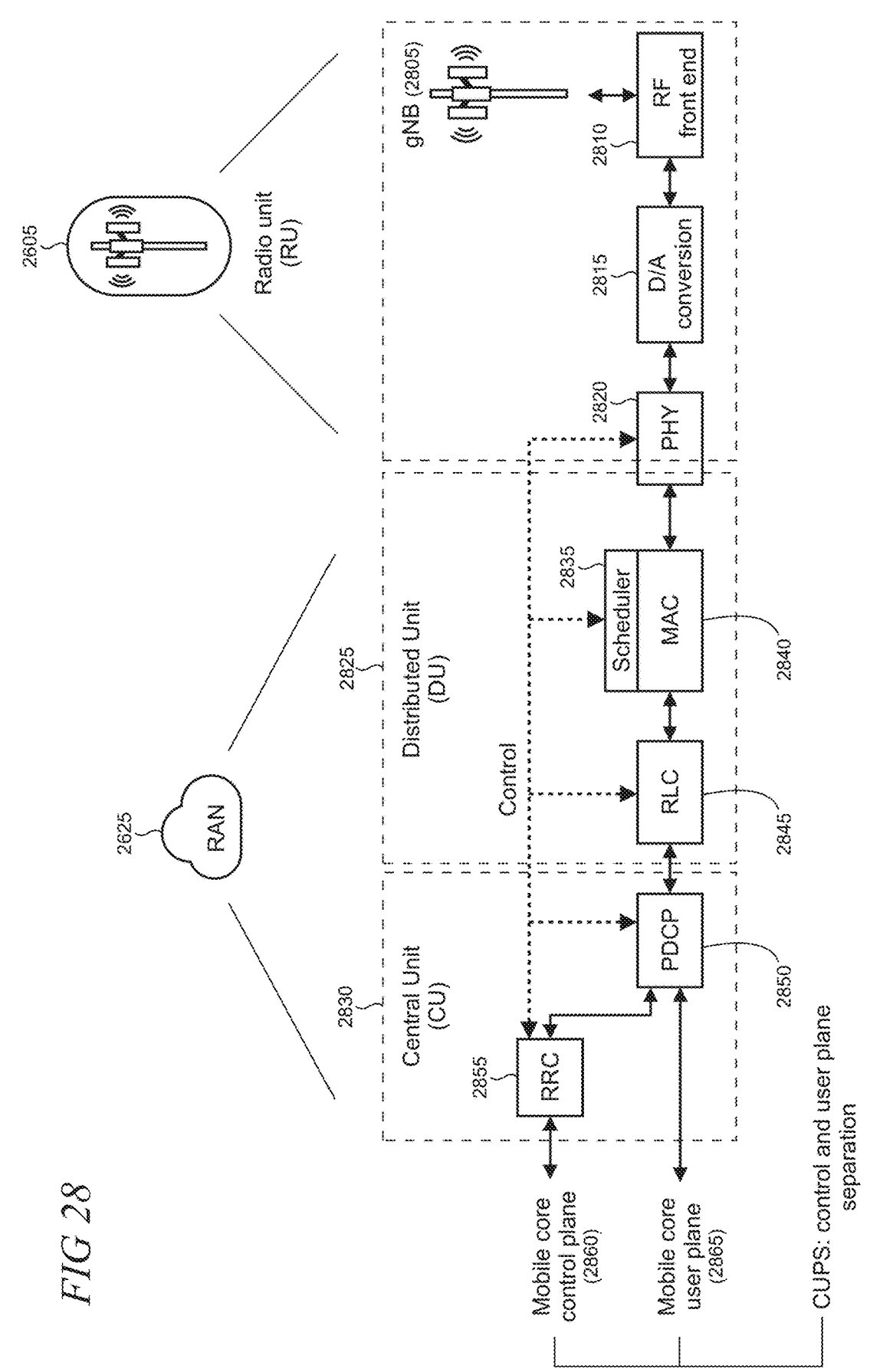
FIG. 28 shows an illustrative 5G radio access network (RAN) and radio unit (RU)

FIG. 28 shows functional blocks of the RAN 2625 and RU 2605. The RU comprises radio transmission points, for example, a next generation Node B, gNB 2805, which handles radio communications with the UE. The gNB is serially coupled to a radio frequency (RF) front end 2810, a digital to analog (D/A) conversion unit 2815, and a portion of the functionality of the physical (PHY) layer 2820 as described in the OSI (Open Systems Interconnection) model.

Under 3GPP and the O-RAN (Open RAN) Alliance, the processing pipeline of the RAN 2625 is split into a distributed unit (DU) 2825, and a central unit (CU) 2830. The DU is responsible for real-time layers 1 and 2 (L1 and L2) scheduling functions, and the CU is responsible for non-real-time, higher L2 and L3 functions. Accordingly, the DU comprises a scheduler 2835 located on top of a MAC (Medium Access Control) layer component 2840, an RLC (radio link control) layer component 2845, and parts of a PHY (physical) layer component 2820. The MAC layer component is responsible for buffering, multiplexing, and demultiplexing segments, including all real-time scheduling decisions about which segments are transmitted when. It is also able to make a "late" forwarding decision (i.e., to alternative carrier frequencies, including Wi-Fi, for example). The PHY layer component is responsible for coding and modulation.

The CU 2830 is configured with a PDCP (Packet Data Convergence Protocol) layer component 2850 and RRC (Radio Resource Control) layer component 2855. The PDCP layer component is responsible for compressing and decompressing IP headers, ciphering and integrity protection, and making an "early" forwarding decision (i.e., whether to send the packet down the pipeline to the UE or forward it to another base station). The RRC layer component is responsible for configuring the coarse-grain and policy-related aspects of the RAN processing pipeline. The RRC layer component interfaces with the control plane 2860 while the PDCP layer component interfaces with the user plane 2865 to thereby implement the "CUPS" (control and user plane separation) feature of 5G.

The split-RAN configuration shown in FIG. 28 enables RAN functionality to be split among physical infrastructure elements in centralized and distributed locations. For example, a single CU 2830 is configurable to serve multiple DUs 2825, each of which in turn serves multiple RUs 2605.

Figure 29:
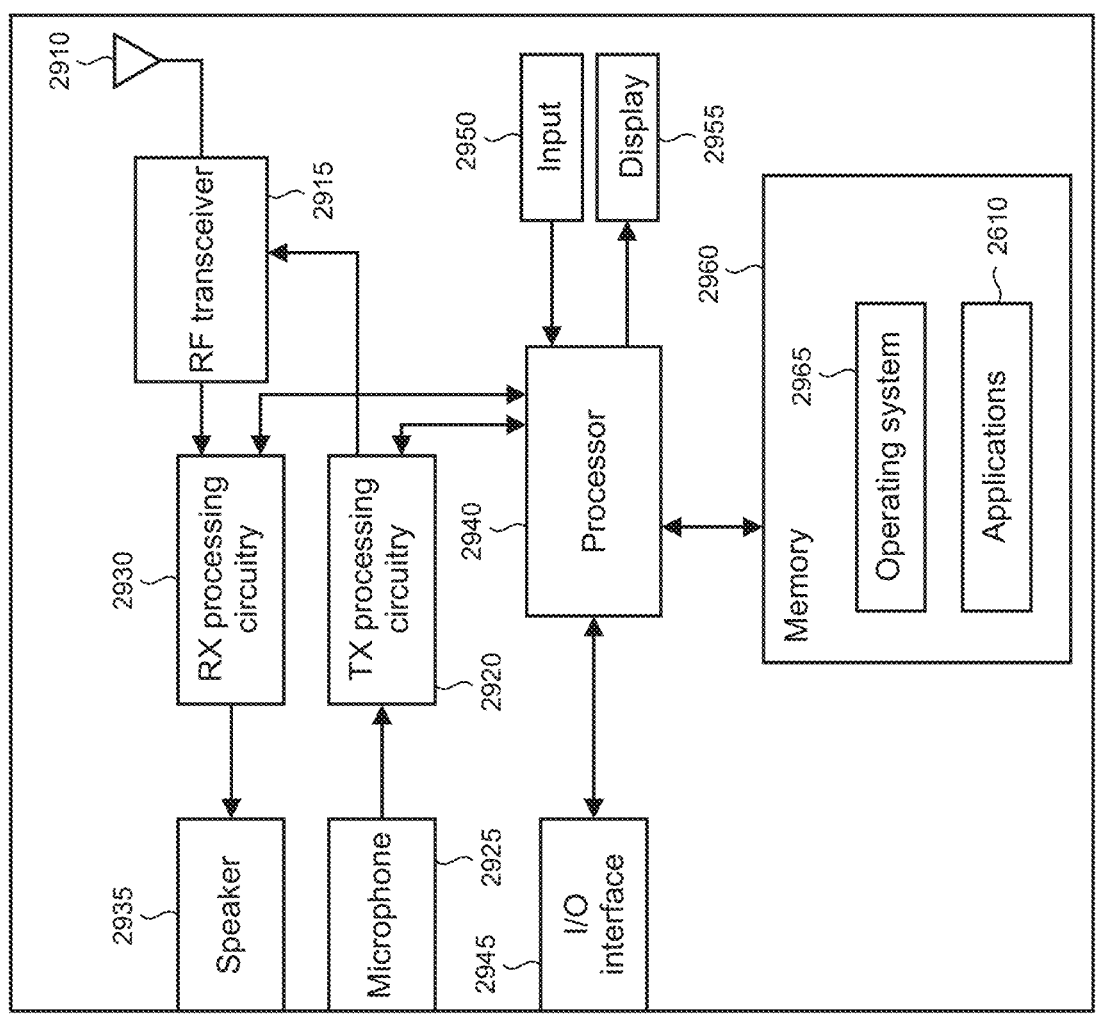
FIG. 29 is a block diagram of an illustrative user equipment (UE) that may be used at least in part to implement the present service assurance in 5G networks using a KPI navigation tool.

FIG. 29 is a block diagram of an illustrative UE 110 that is usable at least in part to implement the present service assurance in 5G networks using a KPI navigation tool. The embodiment of the UE 110 shown in FIG. 29 is for illustration only, and the UEs 110 shown in the drawings and described in the preceding text could have the same or similar configuration. However, it is noted that UEs typically come in a wide variety of configurations, and FIG. 29 does not limit the scope of the present disclosure to any particular implementation of a UE.

The UE 110 includes an antenna 2910, a radio frequency (RF) transceiver 2915, transmit (TX) processing circuitry 2920, a microphone 2925, and receive (RX) processing circuitry 2930. The UE 110 also includes a speaker 2935, a processor 2940, an input/output (I/O) interface 2945, an input device 2950, a display 2955, and a memory 2960. The memory includes an operating system (OS) program 2965 and one or more applications 2610.

The RF transceiver 2915 receives from the antenna 2910, an incoming RF signal transmitted by a gNB of a 5G network. The RF transceiver down-converts the incoming RF signal to generate an intermediate frequency (IF) or baseband signal. The IF or baseband signal is sent to the RX processing circuitry 2930, which generates a processed baseband signal by filtering, decoding, and/or digitizing the baseband or IF signal. The RX processing circuitry transmits the processed baseband signal to the speaker 2935 (such as for voice data) or to the processor 2940 for further processing (such as for web browsing data).

The TX processing circuitry 2920 receives analog or digital voice data from the microphone 2925 or other outgoing baseband data (such as web data, e-mail, or interactive video game data) from the processor 2940. The TX processing circuitry 2920 encodes, multiplexes, and/or digitizes the outgoing baseband data to generate a processed baseband or IF signal. The RF transceiver 2915 receives the outgoing processed baseband or IF signal from the TX processing circuitry and up-converts the baseband or IF signal to an RF signal that is transmitted via the antenna.

The processor 2940 can include one or more processors or other processing devices and execute the OS program 2965 stored in the memory 2960 to control the overall operation of the UE 110. For example, the processor controls the reception of forward channel signals and the transmission of reverse channel signals by the RF transceiver 2915, the RX processing circuitry 2930, and the TX processing circuitry 2920 in accordance with well-known principles. In some embodiments, the processor 2940 includes at least one microprocessor or microcontroller.

The processor 2940 is configured for executing other processes and programs resident in the memory 2960, such as operations for CSI measurement and reporting for systems described in embodiments of the present disclosure. The processor can move data into or out of the memory as required by an executing process. In some embodiments, the processor is configured to execute the applications 2610 based on the OS program 2965 or in response to signals received from gNBs or an operator. The processor is also coupled to the I/O interface 2945, which provides the UE 110 with the ability to connect to other computing devices such as laptop computers and handheld computers. The I/O interface thus functions as a communication path between such accessories and the processor.

The processor 2940 is also coupled to the input device 2950 (e.g., keypad, touchscreen, buttons etc.) and the display 2955. A user of the UE 110 can typically employ the input device to enter data into the UE. For example, the display can be a liquid crystal display or other display capable of rendering text and/or graphics, video, etc. from websites, applications, and/or service providers.

The memory 2960 is coupled to the processor 2940. Part of the memory includes a random access memory (RAM), and another part of the memory includes a Flash memory or other read-only memory (ROM).

As described in more detail below, the UE 110 can perform signaling and calculation for channel state information (CSI) reporting. Although FIG. 29 shows one illustrative example of UE 110, various changes are capable of being made to the drawing. For example, various components are combinable, further subdividable, or omittable, and additional components could be added according to particular needs. As a particular example, the processor 2940 could be divided into multiple processors, such as one or more CPUs and one or more graphics processing units (GPUs). Also, while FIG. 29 depicts the UE 110 as configured as a mobile device, such as a smartphone, UEs are configurable to operate as other types of portable or stationary devices.

Figure 30:
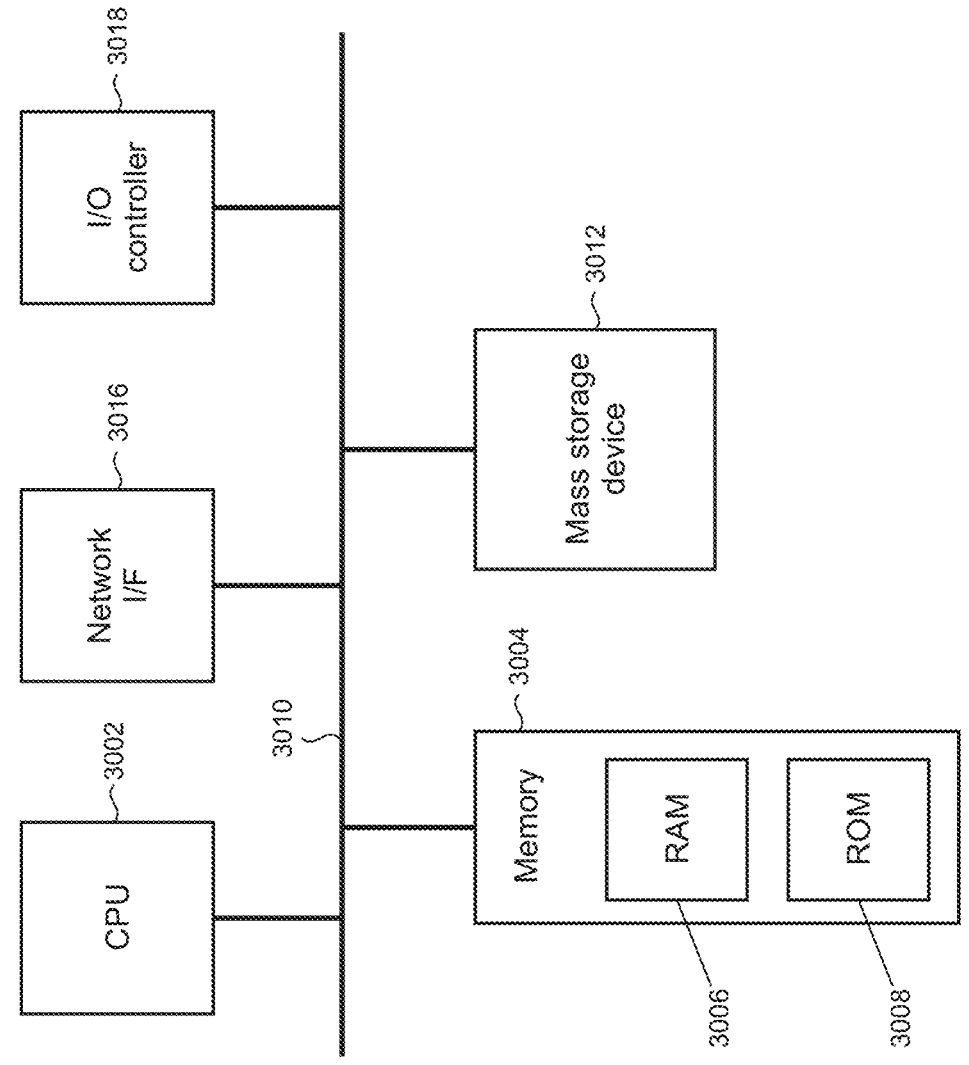
FIG. 30 is a block diagram of an illustrative server or computing device that may be used at least in part to implement the present service assurance in 5G networks using a KPI navigation tool.

FIG. 30 shows an illustrative architecture 3000 for a computing device, such as a server, capable of executing the various components described herein for the present service assurance in 5G networks using a KPI navigation tool. The architecture 3000 illustrated in FIG. 30 includes one or more processors 3002 (e.g., central processing unit, dedicated AI chip, graphics processing unit, etc.), a system memory 3004, including RAM (random access memory) 3006 and ROM (read only memory) 3008, and a system bus 3010 that operatively and functionally couples the components in the architecture 3000. A basic input/output system containing the basic routines that help to transfer information between elements within the architecture 3000, such as during startup, is typically stored in the ROM 3008. The architecture 3000 further includes a mass storage device 3012 for storing software code or other computer-executed code that is utilized to implement applications, the file system, and the operating system. The mass storage device 3012 is connected to the processor 3002 through a mass storage controller (not shown) connected to the bus 3010. The mass storage device 3012 and its associated computer-readable storage media provide non-volatile storage for the architecture 3000. Although the description of computer-readable storage media contained herein refers to a mass storage device, such as a hard disk or CD-ROM drive, computer-readable storage media can be any available storage media that can be accessed by the architecture 3000.

By way of example, and not limitation, computer-readable storage media includes volatile and non-volatile, removable and non-removable media implemented in any method or technology for storage of information such as computer-readable instructions, data structures, program modules, or other data. For example, computer-readable media includes, but is not limited to, RAM, ROM, EPROM (erasable programmable read only memory), EEPROM (electrically erasable programmable read only memory), Flash memory or other solid state memory technology, CD-ROM, DVDs, HD-DVD (High Definition DVD), Blu-ray, or other optical storage, magnetic cassettes, magnetic tape, magnetic disk storage or other magnetic storage devices, or any other medium which can be used to store the desired information and which can be accessed by the architecture 3000.

According to various embodiments, the architecture 3000 operates in a networked environment using logical connections to remote computers through a network. The architecture 3000 connects to the network through a network interface unit 3016 connected to the bus 3010. The network interface unit 3016 is also utilizable to connect to other types of networks and remote computer systems. The architecture 3000 includes an input/output controller 3018 for receiving and processing input from a number of other devices, including a keyboard, mouse, touchpad, touchscreen, control devices such as buttons and switches or electronic stylus (not shown in FIG. 30). Similarly, the input/output controller 3018 provides output to a display screen, user interface, a printer, or other type of output device (also not shown in FIG. 30).

The software components described herein, when loaded into the processor 3002 and executed, transform the processor 3002 and the overall architecture 3000 from a general-purpose computing system into a special-purpose computing system customized to facilitate the functionality presented herein. The processor 3002 is constructed from any number of transistors or other discrete circuit elements, which individually or collectively assume any number of states. More specifically, the processor 3002 is operable as a finite-state machine, in response to executable instructions contained within the software modules disclosed herein. These computer-executable instructions transform the processor 3002 by specifying how the processor 3002 transitions between states, thereby transforming the transistors or other discrete hardware elements constituting the processor 3002.

Encoding the software modules presented herein also transforms the physical structure of the computer-readable storage media presented herein. The specific transformation of physical structure is dependent on various factors, in different implementations of this description. Examples of such factors include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein is encoded on the computer-readable storage media by transforming the physical state of the semiconductor memory. For example, the software transforms the state of transistors, capacitors, or other discrete circuit elements constituting the semiconductor memory. The software also transforms the physical state of such components in order to store data thereupon.

As another example, the computer-readable storage media disclosed herein is implemented using magnetic or optical technology. In such implementations, the software presented herein transforms the physical state of magnetic or optical media, when the software is encoded therein. These transformations include altering the magnetic characteristics of particular locations within given magnetic media. These transformations also include altering the physical features or characteristics of particular locations within given optical media to change the optical characteristics of those locations. Other transformations of physical media are possible without departing from the scope and spirit of the present description, with the foregoing examples provided only to facilitate this discussion.

In light of the above, many types of physical transformations take place in the architecture 3000 in order to store and execute the software components presented herein. The architecture 3000 includes other types of computing devices, including wearable devices, handheld computers, embedded computer systems, smartphones, PDAs, and other types of computing devices known to those skilled in the art. It is also contemplated that the architecture 3000 does not need to include all of the components shown in FIG. 30, is configurable to include other components that are not explicitly shown in FIG. 30, or is configurable to utilize an architecture completely different from that shown in FIG. 30.

Figure 31:
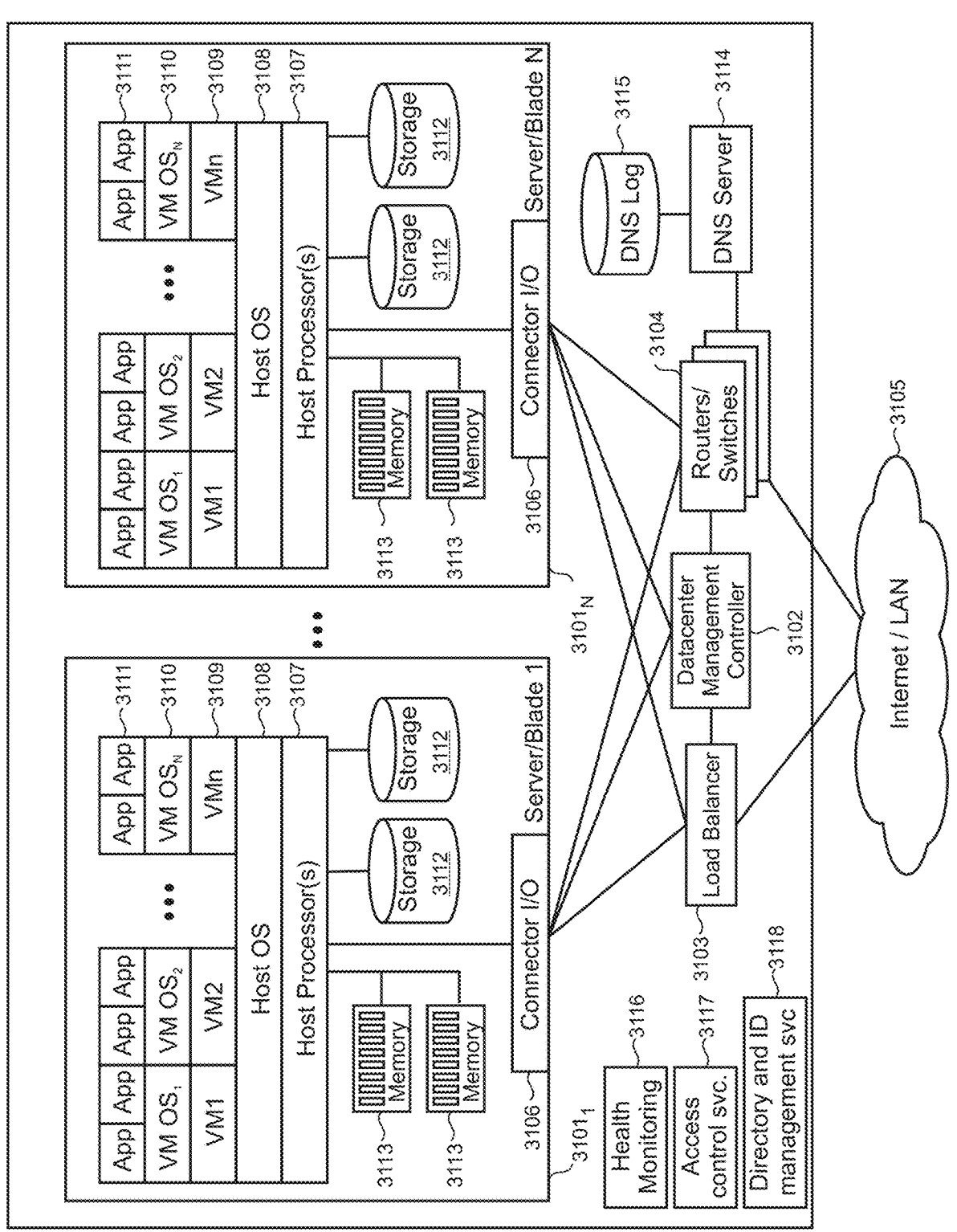
FIG. 31 is a block diagram of an illustrative datacenter that may be used at least in part to implement the present service assurance in 5G networks using a KPI navigation tool.

FIG. 31 is a high-level block diagram of an illustrative datacenter 3100 that provides cloud computing services or distributed computing services that are usable, at least in part, to implement the present service assurance in 5G networks using a KPI navigation tool. Datacenter 3100 typically incorporates one or more of the features disclosed in the DCs shown in the drawings and described in the accompanying text. A plurality of servers 3101 are managed by datacenter management controller 3102. Load balancer 3103 distributes requests and computing workloads over servers 3101 to avoid a situation wherein a single server becomes overwhelmed. Load balancer 3103 maximizes available capacity and performance of the resources in datacenter 3100. Routers/switches 3104 support data traffic between servers 3101 and between datacenter 3100 and external resources and users (not shown) via an external network 3105, which typically includes, for example, a local area network (LAN) or the Internet.

Servers 3101 are configurable as standalone computing devices, and/or they are configurable as individual blades in a rack of one or more server devices. Servers 3101 have an input/output (I/O) connector 3106 that manages communication with other database entities. One or more host processors 3107 on each server 3101 run a host operating system (OS) 3108 that supports multiple virtual machines (VM) 3109. Each VM 3109 typically runs its own OS so that each VM OS 3110 on a server is different, or the same, or a mix of both. The VM OSs 3110 are configurable using, for example, different versions of the same OS (e.g., different VMs running different current and legacy versions of the Windows® operating system). In addition, or alternatively, instances of the VM OSs 3110 are provided by different manufacturers (e.g., some VMs running the Windows® operating system, while other VMs are running the Linux® operating system). Each VM 3109 typically also runs one or more applications (App) 3111. Each server 3101 also includes storage 3112 (e.g., hard disk drives (HDD)) and memory 3113 (e.g., RAM) that is accessed and used by the host processors 3107 and VMs 3109 for storing software code, data, etc. In one embodiment, a VM 3109 employs the data plane APIs as disclosed herein.

Datacenter 3100 provides pooled resources on which customers or tenants can dynamically provision and scale applications as needed without having to add servers or additional networking. This allows tenants to obtain the computing resources they need without having to procure, provision, and manage infrastructure on a per-application, ad-hoc basis. A cloud computing datacenter 3100 allows tenants to scale up or scale down resources dynamically to meet the current needs of their business. Additionally, a datacenter operator can provide usage-based services to tenants so that they pay for only the resources they use, when they need to use them. For example, a tenant initially uses one VM 3109 on server $3101_1$ to run their applications 3111. When demand for an application 3111 increases, the datacenter 3100 activates additional VMs 3109 on the same server $3101_1$ and/or on a new server $3101_N$ as needed. These additional VMs 3109 can be deactivated if demand for the application later drops.

Datacenter 3100 typically offers guaranteed availability, disaster recovery, and back-up services. For example, the datacenter designates one VM 3109 on server $3101_1$ as the primary location for the tenant's application and activates a second VM 3109 on the same or a different server as a standby or back-up in case the first VM or server $3101_1$ fails.

The datacenter management controller 3102 automatically shifts incoming user requests from the primary VM to the back-up VM without requiring tenant intervention. Although datacenter 3100 is illustrated as a single location, it will be understood that servers 3101 are distributable to multiple locations across the globe to provide additional redundancy and disaster recovery capabilities. Additionally, datacenter 3100 is configurable as an on-premises, private system that provides services to a single enterprise user or configurable to be a publicly accessible, distributed system that provides services to multiple, unrelated customers and tenants or configurable as a combination of both.

Domain Name System (DNS) server 3114 resolves domain and host names into IP addresses for all roles, applications, and services in datacenter 3100. DNS log 3115 maintains a record of which domain names have been resolved by role. It will be understood that DNS is used herein as an example and that other name resolution services and domain name logging services are usable to identify dependencies, for example, in other embodiments, IP or packet sniffing, code instrumentation, or code tracing.

Datacenter health monitoring 3116 monitors the health of the physical systems, software, and environment in datacenter 3100. Health monitoring 3116 provides feedback to datacenter managers when problems are detected with servers, blades, processors, or applications in datacenter 3100 or when network bandwidth or communications issues arise.

Access control service 3117 determines whether users are allowed to access particular connections and services provided at the datacenter 3100. Directory and identity management service 3118 authenticates user credentials for tenants on datacenter 3100.

Figure 32:
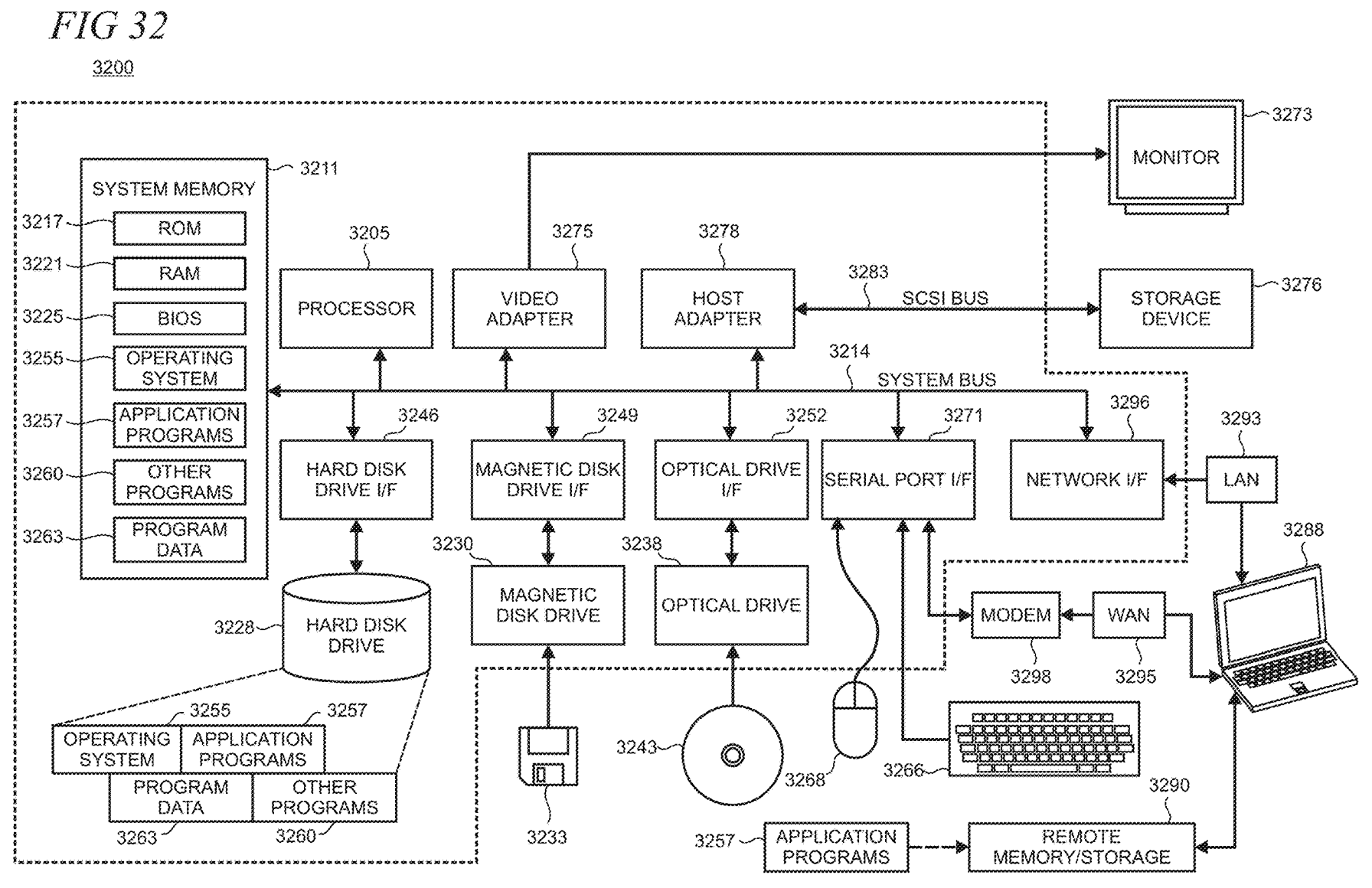

FIG. 32 is a simplified block diagram of an illustrative computer system 3200 such as a PC, client machine, or server, usable, at least in part, to implement the present service assurance in 5G networks using a KPI navigation tool. Computer system 3200 includes a processor 3205, a system memory 3211, and a system bus 3214 that couples various system components including the system memory 3211 to the processor 3205. The system bus 3214 is any of several types of bus structures including a memory bus or memory controller, a peripheral bus, or a local bus using any of a variety of bus architectures. The system memory 3211 includes read only memory (ROM) 3217 and random access memory (RAM) 3221. A basic input/output system (BIOS) 3225, containing the basic routines that help to transfer information between elements within the computer system 3200, such as during startup, is stored in ROM 3217. The computer system 3200 further includes a hard disk drive 3228 for reading from and writing to an internally disposed hard disk (not shown), a magnetic disk drive 3230 for reading from or writing to a removable magnetic disk 3233 (e.g., a floppy disk), and an optical disk drive 3238 for reading from or writing to a removable optical disk 3243 such as a CD (compact disc), DVD (digital versatile disc), or other optical media. The hard disk drive 3228, magnetic disk drive 3230, and optical disk drive 3238 are connected to the system bus 3214 by a hard disk drive interface 3246, a magnetic disk drive interface 3249, and an optical drive interface 3252, respectively. The drives and their associated computer-readable storage media provide non-volatile storage of computer-readable instructions, data structures, program modules, and other data for the computer system 3200. Although this illustrative example includes a hard disk, a removable magnetic disk 3233, and a removable optical disk 3243, other types of computer-readable storage media which can store data that is accessible by a computer such as magnetic cassettes, Flash memory cards, digital video disks, data cartridges, random access memories (RAMs), read only memories (ROMs), and the like are also usable in some applications of the present service assurance in 5G networks using a KPI navigation tool. In addition, as used herein, the term computer-readable storage media includes one or more instances of a media type (e.g., one or more magnetic disks, one or more CDs, etc.). For purposes of this specification and the claims, the phrase "computer-readable storage media" and variations thereof, are intended to cover non-transitory embodiments, and do not include waves, signals, and/or other transitory and/or intangible communication media.

A number of program modules are storable on the hard disk, magnetic disk 3233, optical disk 3243, ROM 3217, or RAM 3221, including an operating system 3255, one or more application programs 3257, other program modules 3260, and program data 3263. A user enters commands and information into the computer system 3200 through input devices such as a keyboard 3266 and pointing device 3268 such as a mouse. Other input devices (not shown) include a microphone, joystick, game pad, satellite dish, scanner, trackball, touchpad, touchscreen, touch-sensitive device, voice-command module or device, user motion or user gesture capture device, or the like. These and other input devices are often connected to the processor 3205 through a serial port interface 3271 that is coupled to the system bus 3214, but are connectable by other interfaces, such as a parallel port, game port, or universal serial bus (USB). A monitor 3273 or other type of display device is also connected to the system bus 3214 via an interface, such as a video adapter 3275. In addition to the monitor 3273, personal computers typically include other peripheral output devices (not shown), such as speakers and printers. The illustrative example shown in FIG. 32 also includes a host adapter 3278, a Small Computer System Interface (SCSI) bus 3283, and an external storage device 3276 connected to the SCSI bus 3283.

The computer system 3200 is operable in a networked environment using logical connections to one or more remote computers, such as a remote computer 3288. The remote computer 3288 is selectable as another personal computer, a server, a router, a network PC, a peer device, or other common network node, and typically includes many or all of the elements described above relative to the computer system 3200, although only a single representative remote memory/storage device 3290 is shown in FIG. 32. The logical connections depicted in FIG. 32 include a local area network (LAN) 3293 and a wide area network (WAN) 3295. Such networking environments are often deployed, for example, in offices, enterprise-wide computer networks, intranets, and the Internet.

When used in a LAN networking environment, the computer system 3200 is connected to the local area network 3293 through a network interface or adapter 3296. When used in a WAN networking environment, the computer system 3200 typically includes a broadband modem 3298, network gateway, or other means for establishing communications over the wide area network 3295, such as the Internet. The broadband modem 3298, which is either internal or external, is connected to the system bus 3214 via a serial port interface 3271. In a networked environment, program modules related to the computer system 3200, or portions thereof, are storable in the remote memory storage device 3290. It is noted that the network connections shown in FIG. 32 are illustrative and other means of establishing a communications link between the computers are usable depending on the specific requirements of an application of the present service assurance in 5G networks using a KPI navigation tool.

Various exemplary embodiments of the present service assurance in 5G networks using a KPI navigation tool are now presented by way of illustration and not as an exhaustive list of all embodiments. An example includes a computer-implemented method for service assurance in a mobile network comprising: generating an ontology of the mobile network comprising a structured machine-readable data model for network elements in the mobile network and data interfaces among the network elements; extracting a key performance indicator (KPI) graph from the ontology, the graph providing a representation of KPIs for the mobile network and associated counters, located on the network elements, configured for recording events at the data interfaces; selecting a subset of the extracted KPIs and associated counters from the graph for inclusion in a catalog; and providing a navigation tool having a user interface, the navigation tool configured to facilitate browsing of the catalog by a user, the browsing including discovering relationships among the KPIs and associated counters.

In another example, the KPI graph comprises a Bayesian network. In another example, the navigation tool is arranged to export KPI graph data into an external data visualization tool. In another example, one or more of the network elements support a virtualized network function (VNF). In another example, the computer-implemented method further comprises configuring the navigation tool to implement a visual language to assist a user to discover the relationships using the user interface. In another example, the visual language provides graphically-based links between KPIs in the catalog. In another example, the graphically-based links comprise icons associated with respective KPI categories, the categories selected from one of accessibility, integrity, retainability, or mobility. In another example, the computer-implemented method further comprises generating a plurality of different versions of the ontology of the mobile network and performing semantic mapping between the different versions. In another example, the catalog is curated to include KPIs meeting one or more predefined criteria.

A further example includes one or more hardware-based non-transitory computer-readable memory devices storing computer-executable instructions which, upon execution by one or more processors disposed in a computing device, cause the computing device to: implement a machine learning system configured for creating a semantic data model of a software-defined mobile network, the semantic data model representing network elements in the software-defined mobile network and data interfaces among the network elements, the machine learning system comprising a multi-layer neural network; train the semantic data model by inputting representations of a training dataset of network elements and interfaces into the machine learning system and adjusting weights in one or more layers of the neural network to minimize an error function at an output of the machine learning system; populate the semantic data model by inputting representations of an unknown dataset of network elements and data interfaces into the machine learning system to create labeled output; and utilize the populated semantic data model to create a graph of key performance indicators (KPIs) applicable to the mobile network, the graph identifying ontological relationships for KPIs among specific instances of network elements and data interfaces in the software-defined mobile network.

In another example, the machine learning system comprises a convolutional neural network. In another example, the representations of each of the training dataset and the unknown dataset comprise vector representations. In another example, the semantic data model comprises an ontology having a plurality of nodes representing the network elements and point-to-point interfaces among the network elements, the network elements comprising physical and logical systems and subsystems in a deployed instance of the software-defined mobile network. In another example, the ontology further comprises point-to-point data interfaces between the network elements, the point-to-point interfaces described by 3GPP (3rd Generation Partnership Project) TS 23 501.

A further example includes a computing device used by a key performance indicator (KPI) service, comprising: one or more processors; memory in electronic communication with the one or more processors; a user interface (UI); and one or more hardware-based non-transitory computer-readable storage devices having computer-executable instructions stored thereon which, when executed by the one or more processors, cause the computing device to instantiate a KPI discovery engine having an application programming interface (API) through which the computing device is interoperable with a mobile network for which KPIs for the mobile network are discoverable, the mobile network being represented by a reference point architecture comprising network elements interoperating through data interfaces; operate the KPI discovery engine to inspect reference points in the mobile network to determine relationships of counters associated with network elements with KPIs; in response to the inspecting, generate a catalog of selected KPIs; and expose the catalog of selected KPIs through the UI.

In another example, the computer-executable instructions further cause the computing device to expose the catalog of selected KPIs through a UI of a KPI navigation tool, wherein the KPI navigation tool is configured to implement a visual language to enable a user to navigate among the selected KPIs in the catalog by manipulating one or more graphical icons. In another example, the KPI discovery performs KPI discovery for generating an ontological representation of the mobile network and further performs maintenance of the ontological representation based on dynamic changes of datasets from the data interfaces. In another example, the computer-executable instructions further cause the computing device to configure the navigation tool for interoperability with a data visualization tool, the data visualization tool providing one or more visuals of KPI data. the KPI discovery engine comprises a machine learning system. In another example, the catalog of KPIs includes representations of counters that are associated with each KPI instance, the counters tracking data events occurring on the data interfaces.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. One or more hardware-based non-transitory computer-readable memory devices storing computer-executable instructions which, in response to execution by one or more processors disposed in a computing device, cause the computing device to:

access a machine learning system configured for creating a semantic data model of a software-defined mobile network, the semantic data model representing network elements in the software-defined mobile network and data interfaces among the network elements, the machine learning system comprising a multi-layer neural network, wherein:

the semantic data model comprises an ontology having a plurality of nodes representing the network elements and point-to-point interfaces among the network elements, the network elements comprising physical and logical systems and subsystems in a deployed instance of the software-defined mobile network; and one or more of the network elements support a virtualized network function (VNF);

train the semantic data model by inputting representations of a training dataset of network elements and interfaces into the machine learning system and adjusting weights in one or more layers of the neural network to minimize an error function at an output of the machine learning system;

populate the semantic data model by inputting representations of an unknown dataset of network elements and data interfaces into the machine learning system to create labeled output;

generate a plurality of different versions of the ontology of the software-defined mobile network and perform semantic mapping between the different versions; and utilize the populated semantic data model to create a graph of key performance indicators (KPIs) applicable to the mobile network, the graph identifying ontological relationships for KPIs among specific instances of network elements and data interfaces in the software-defined mobile network.

2. The one or more hardware-based non-transitory computer-readable memory devices of claim 1 in which the machine learning system comprises a convolutional neural network.

3. The one or more hardware-based non-transitory computer-readable memory devices of claim 1 in which software-defined mobile network comprises a fifth generation (5G) mobile network.

4. The one or more hardware-based non-transitory computer-readable memory devices of claim 1 in which the ontology further comprises point-to-point data interfaces between the network elements, the point-to-point interfaces described by 3GPP (3$^{rd}$ Generation Partnership Project) TS 23 501.

5. A computer-implemented method for service assurance in a mobile network comprising:

accessing a machine learning system configured for creating a semantic data model of a software-defined mobile network, the semantic data model representing network elements in the software-defined mobile network and data interfaces among the network elements, the machine learning system comprising a multi-layer neural network, wherein:

the semantic data model comprises an ontology having a plurality of nodes representing the network elements and point-to-point interfaces among the network elements, the network elements comprising physical and logical systems and subsystems in a deployed instance of the software-defined mobile network; and one or more of the network elements support a virtualized network function (VNF);

training the semantic data model by inputting representations of a training dataset of network elements and interfaces into the machine learning system and adjusting weights in one or more layers of the neural network to minimize an error function at an output of the machine learning system;

populating the semantic data model by inputting representations of an unknown dataset of network elements and data interfaces into the machine learning system to create labeled output;

generating a plurality of different versions of the ontology of the software-defined mobile network and performing semantic mapping between the different versions; and utilizing the populated semantic data model to create a graph of key performance indicators (KPIs) applicable to the mobile network, the graph identifying ontological relationships for KPIs among specific instances of network elements and data interfaces in the software-defined mobile network.

6. The method of claim 5, wherein the machine learning system comprises a convolutional neural network.

7. The method of claim 5, wherein software-defined mobile network comprises a fifth generation (5G) mobile network.

8. The method of claim 5, wherein the ontology further comprises point-to-point data interfaces between the network elements, the point-to-point interfaces described by 3GPP ($3^{rd}$ Generation Partnership Project) TS 23 501.

9. A computing device used by a key performance indicator (KPI) service, comprising:

one or more processors;

memory in electronic communication with the one or more processors;

a user interface (UI); and one or more hardware-based non-transitory computer-readable storage devices having computer-executable instructions stored thereon which, when executed by the one or more processors, cause the computing device to perform operations comprising:

access a machine learning system configured for creating a semantic data model of a software-defined mobile network, the semantic data model representing network elements in the software-defined mobile network and data interfaces among the network elements, the machine learning system comprising a multi-layer neural network, wherein:

the semantic data model comprises an ontology having a plurality of nodes representing the network elements and point-to-point interfaces among the network elements, the network elements comprising physical and logical systems and subsystems in a deployed instance of the software-defined mobile network; and one or more of the network elements support a virtualized network function (VNF);

train the semantic data model by inputting representations of a training dataset of network elements and interfaces into the machine learning system and adjusting weights in one or more layers of the neural network to minimize an error function at an output of the machine learning system;

populate the semantic data model by inputting representations of an unknown dataset of network elements and data interfaces into the machine learning system to create labeled output;

generate a plurality of different versions of the ontology of the software-defined mobile network and perform semantic mapping between the different versions; and utilize the populated semantic data model to create a graph of key performance indicators (KPIs) applicable to the mobile network, the graph identifying ontological relationships for KPIs among specific instances of network elements and data interfaces in the software-defined mobile network.

10. The computing device of claim 9, wherein the machine learning system comprises a convolutional neural network.

11. The computing device of claim 9, wherein software-defined mobile network comprises a fifth generation (5G) mobile network.

12. The computing device of claim 9, wherein the ontology further comprises point-to-point data interfaces between the network elements, the point-to-point interfaces described by 3GPP ($3^{rd}$ Generation Partnership Project) TS 23 501.

* * * * *